(12) United States Patent
Yamada et al.

(10) Patent No.: US 6,804,302 B1
(45) Date of Patent: Oct. 12, 2004

(54) MULTIMEDIA INFORMATION CODING APPARATUS, CODING METHOD OF MULTIMEDIA INFORMATION, AND RECORDING MEDIA STORING DATA CODED BY THE SAME METHOD

(75) Inventors: Kazunori Yamada, Tokyo (JP); Atsushi Ando, Kanagawa (JP); Tsutomu Uenoyama, Kanagawa (JP); Daisaku Komiya, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/407,487

(22) Filed: Sep. 28, 1999

(30) Foreign Application Priority Data

Sep. 28, 1998 (JP) .......................................... 10-273373

(51) Int. Cl.⁷ ................................................ H04N 7/12
(52) U.S. Cl. ................................................ 375/240.16
(58) Field of Search ....................... 375/240.16, 240.12, 375/240.02, 240.13, 240.18; 345/302; 386/131, 95, 111; H04N 7/12

(56) References Cited

U.S. PATENT DOCUMENTS

| | | | | |
|---|---|---|---|---|
| 4,979,037 A | * | 12/1990 | Mizutani et al. | 375/240.21 |
| 5,355,450 A |   | 10/1994 | Garmon et al. | |
| 5,745,645 A | * | 4/1998 | Nakamura et al. | 386/131 |
| 5,946,043 A | * | 8/1999 | Lee et al. | 375/240.24 |
| 6,072,479 A | * | 6/2000 | Ogawa | 707/104.1 |
| 6,078,328 A | * | 6/2000 | Schumann et al. | 345/418 |
| 6,438,315 B1 | * | 8/2002 | Suzuki et al. | 386/95 |
| 6,490,627 B1 | * | 12/2002 | Kalra et al. | 709/231 |

FOREIGN PATENT DOCUMENTS

JP          06301495          10/1994

OTHER PUBLICATIONS

European Search Report for EP 99 11 8830, dated Dec. 22, 2003.

Yun, et al., "Architectures for Multi–Source Multi–User Video Compositing", ACM Multimedia, Proceedings of the International Conference, New York, NY, pp. 215–223, Aug. 1, 1993.

Senoh, et al., "Multimedia Technology Trend in MPEG4", IEICE Transactions on Electronics, Institute of Electronics Information and COMM. ENG, Tokyo, JP, vol. E81–C, No. 5, pp. 642–649, May, 1998.

"MPEG–4 Video Verification Model Version 7.0", International Organization for Standardization—Organisation Internationale De Normalisation, vol. N1642, pp. 1–271, Apr., 1997.

Mitchell, et al., "MPEG Video Compression Standard", MPEG Video Compression Standard, Chapman and Hall Digital Multimedia Standards Series, New York, Chapman and Hall, US, pp. 99, 160, 297, 313, 315, 331 (1996).

* cited by examiner

*Primary Examiner*—Nhon Diep
(74) *Attorney, Agent, or Firm*—RatnerPrestia

(57) ABSTRACT

A multimedia title including sources of plural data-types such as a motion picture, still picture and text data, presentation methods of respective sources, and the data-types is edited in every frame, so that a video signal is created. Based on a scenario, the video signal is coded adaptively to respective data-types of each source. As a result, calculation volume is reduced and picture quality is improved.

23 Claims, 44 Drawing Sheets

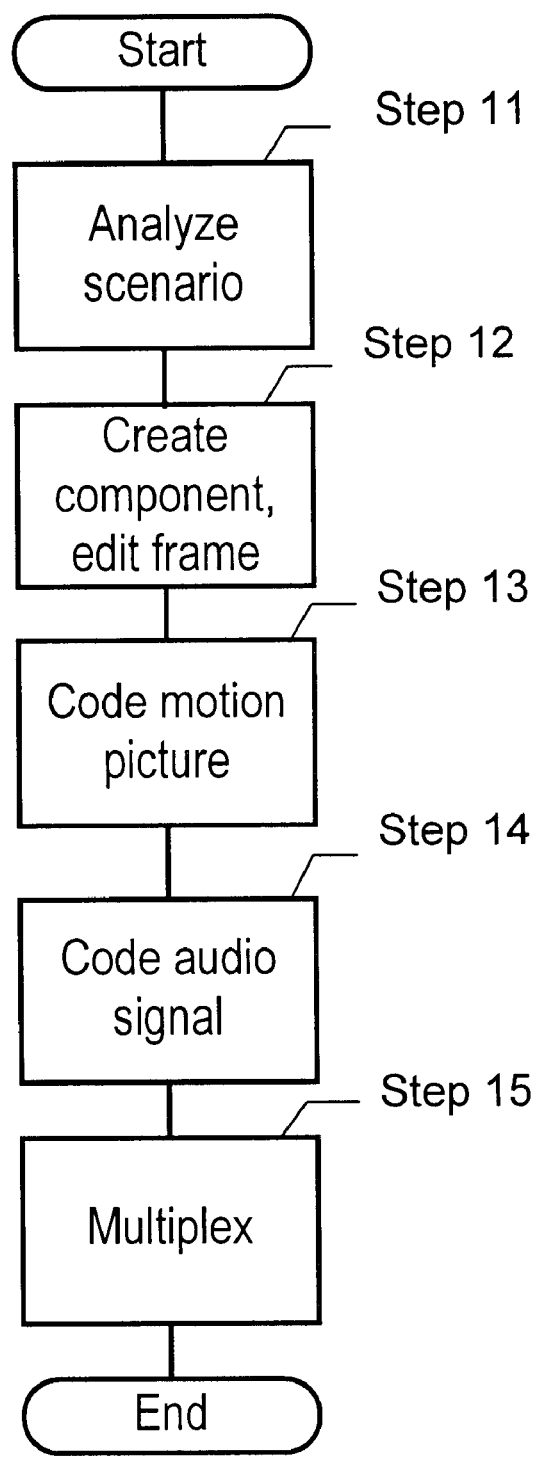

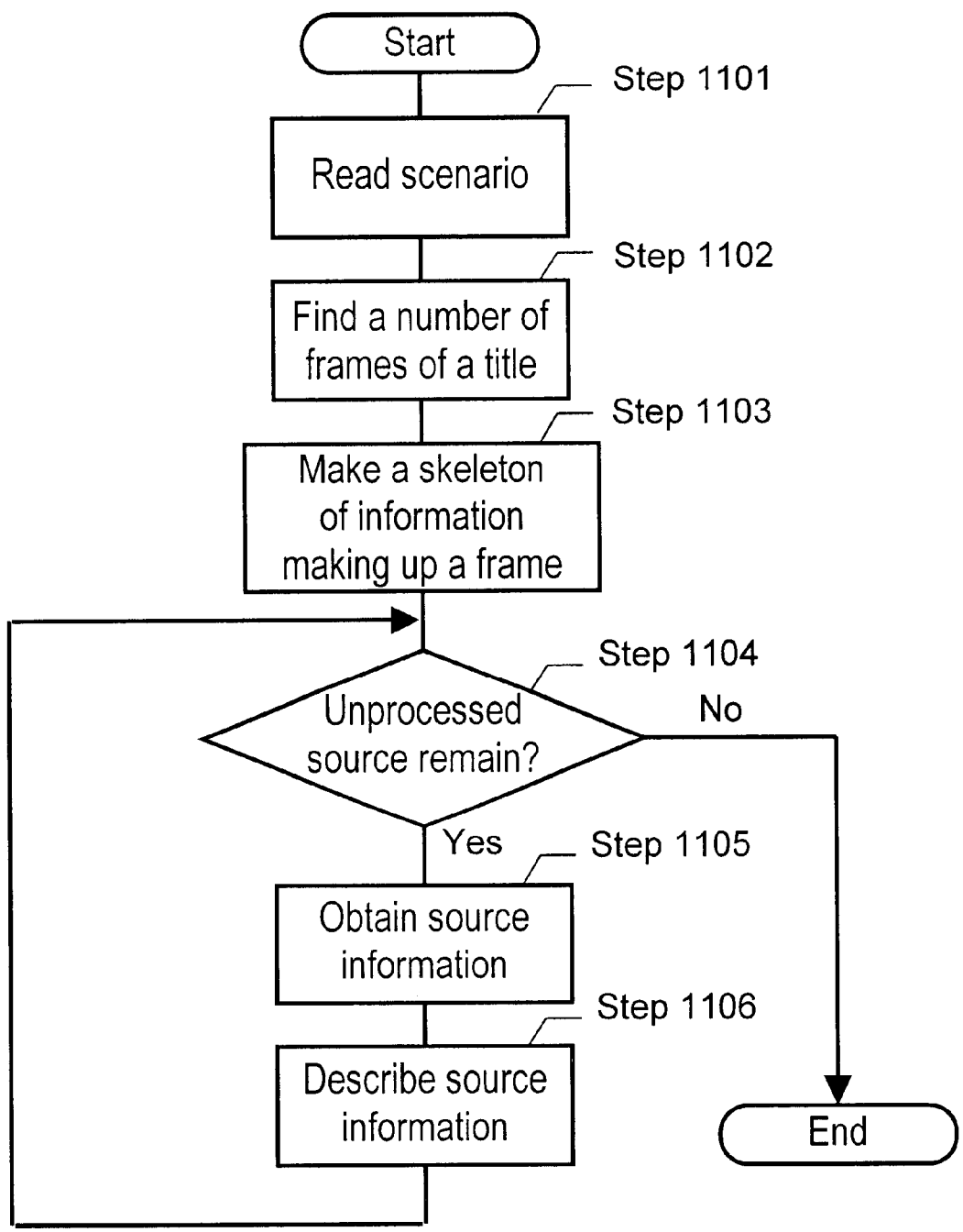

FIG. 11

Frame size information
Source file name
{
Data-type information
Time information
Region information
}
Source file name
{
Data-type information
Time information
Region information
}

FIG. 12

Frame size (x,y)
Source file name
{
Data-type - motion picture
Time - (starting time, ending time)
Region - start point (x1, y1) end point (x2,y2)
}
Source file name
{
Data-type - still picture
Time - (starting time, ending time)
Region - start point(x1, y1) end point(x2,y2)
}

FIG. 15

Frame No.

{

Frame size information
Data-type information
Region information
Appearing information
Data-type information
Region information
Appearing information

.
.

}

Frame No.

{

Frame size information
Data-type information

| Macro-block ID | Quantization characteristics |
|---|---|
| 1 | 3 |
| 2 | 3 |
| 3 | 13 |
| 4 | 9 |
| ... | |
| 127 | 2 |
| 128 | 3 |
| (end) | |

FIG. 17

| Data-type | Quantization characteristics |
|---|---|
| Motion picture | = 9 |
| High-quality still picture | = 3 |
| High-quality text | = 2 |
| Background | = 13 |
| Others | = ? |

FIG. 25

| Macro-block ID | Intra flag |
|---|---|
| 1 | 1 |
| 2 | 0 |
| 3 | 0 |
| 4 | 1 |
| ⋮ | |
| 127 | 0 |
| 128 | 1 |
| XXX (end) | |

FIG. 29

| Macro-block ID | Escape-information-flag |
|---|---|
| 1 | 1 |
| 2 | 0 |
| 3 | 0 |
| 4 | 1 |
| ⋮ | |
| 127 | 0 |
| 128 | 1 |
| XXX (end) | |

FIG. 30

| Macro-block ID | Quantization matrix ID |
|---|---|
| 1 | a |
| 2 | a |
| 3 | b |
| 4 | c |
| ⋮ | |
| 127 | a |
| 128 | a |
| XXX (end) | |

FIG. 31

| Data-type | Quantization matrix ID |
|---|---|
| Motion picture | = a |
| High-quality text | = c |
| Background | = d |
| Others | = ? |

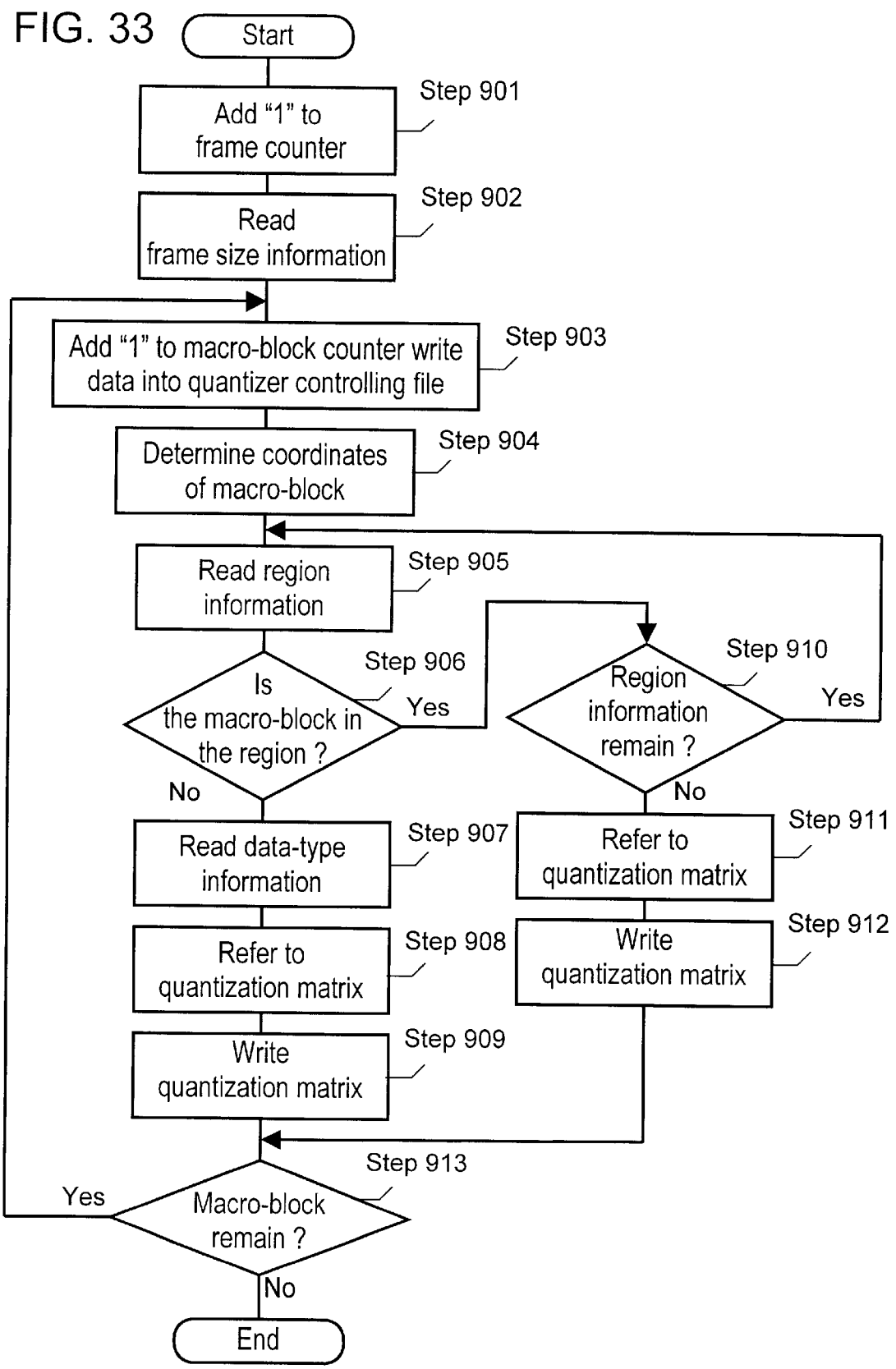

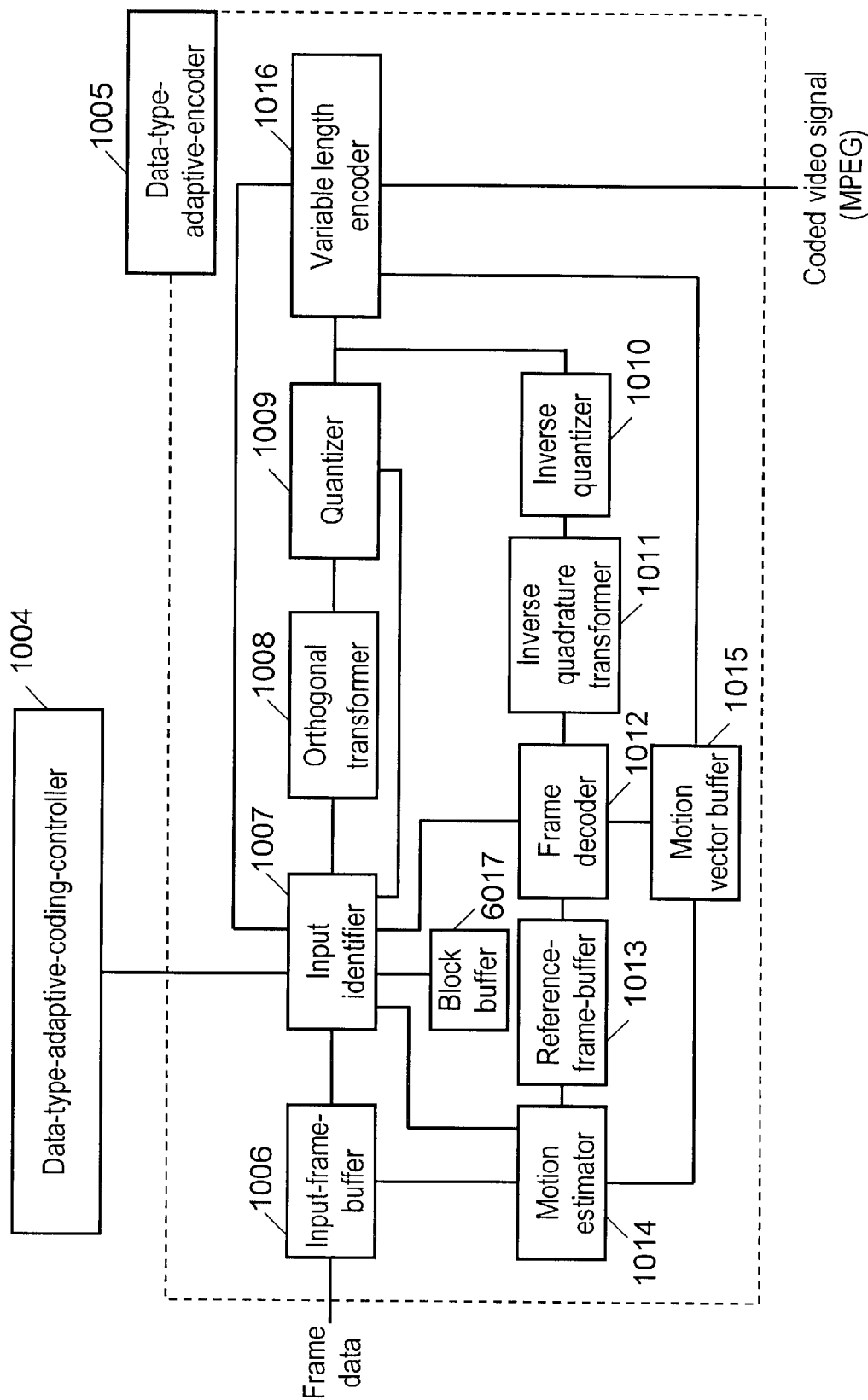

One macro-block

Enlarge image one macro-black

MULTIMEDIA INFORMATION CODING APPARATUS, CODING METHOD OF MULTIMEDIA INFORMATION, AND RECORDING MEDIA STORING DATA CODED BY THE SAME METHOD

FIELD OF THE INVENTION

The present invention relates to a technique of editing a multimedia title which comprises various sources such as motion pictures, still pictures, text data, background still image, graphics, and a scenario describing the source list, presentation method and characteristics of the sources into video signals. It also relates to a technique of coding a type of sequential video signals into coded video signals such as MPEG responsive to a type of data.

In this specification, the technical terms used in the above paragraph are defined as follows:

"source" : a displayed unit of respective types of information such as motion pictures, still pictures, text data, background still image, graphics, and the like "scenario" : a method of displaying a source, e.g. a timing and a location in a screen of a source to be output "multimedia title" : data comprising sources and their scenarios "data type" : characteristics of a source, such as a type of information, picture quality, application, and process provided

BACKGROUND OF THE INVENTION

In recent years awareness of multimedia has increased in the market, and video-on-demand-systems have drawn consumers' attention because this system can provide users with moving pictures on a television set or a personal computer anytime when the users want to watch them.

In the video-on-demand-system, a video comprising various data such as motion pictures, still pictures, text data and the like is presented as a multimedia title so that an efficient presentation can be achieved. Therefore, the market has demanded a multimedia-on-demand-system that delivers multimedia titles responsive to requests from respective terminals, which then reproduce the titles.

The following two methods are available for reproducing the multimedia title.

(1) The reproduction terminal relevantly reproduces, decodes and edits respective sources following their scenarios, and then displays them at a specified time in a specified region so that a plurality of videos can be edited on a screen.

(2) The terminal reproduces respective sources based on information from their scenarios by using reproducing methods relevant to each source, and edits them on a screen.

According to the methods discussed above, the terminal must display respective sources in accordance with their characteristics e.g. text data is developed into fonts. In the case of multimedia title including motion pictures, the terminal must have versatile functions such as displaying motion pictures, still pictures and text data. As such, reproduction of the multimedia title demands a lot of functions of the terminal, thus reducing processes in the terminal is needed.

A technique for reducing a number of functions in the terminal is disclosed in the Japanese Patent Application Non-examined Publication No. H06-301495. It teaches that if the terminal has no character-font-information, the data to be input to the terminal can be equipped with some character fonts responding to characters used in a content of a presentation so that the characters can be reproduced. However, this method does not contribute to reduce a lot of functions in the terminal.

Another method is that a combination of e.g. a scan converter with a hard encoder converts the multimedia title into coded video signals. Most of the scan converters only accept sources converted into analog-signals, and this conversion deteriorates picture quality. The hard encoder does not provide an optimal coding to the sources such as still pictures and text data which can predict the next frame, but provide the same coding as other sources such as motion pictures. Unnecessary coding is thus provided, which lowers picture quality and demands a lot of calculation. The hard encoder also provides the same weighing as other sources ☐ natural images including motion and still picture ☐ to text data, graphics or monotonous artificial images. These artificial images are painted with less numbers of colors and can be used in background. Then the weighted data are quantized, and thus picture quality is lowered.

SUMMARY OF THE INVENTION

The present invention addresses the problems discussed above and aims to achieve the following targets.

(1) Realize a low cost reproduction terminal by editing a multimedia title into a type of video signals so that a necessary process for the terminal is only a reproduction of motion pictures.

(2) Code the edited video signals so that the following objectives can be realized: 2–1. Improving picture quality, 2–2. Reducing a number of calculations, and 2–3. Improving a coding rate.

In order to achieve the goals discussed above, the present invention edits a multimedia title into a type of video signals such as motion pictures. The multimedia title comprises various sources including motion pictures, still pictures, text data, background still pictures, and the like as well as scenarios including the source list, methods of presentation and characteristics of the sources.

The present invention then codes the edited video signals into coded video signals such as MPEG. When coding, the present invention utilizes the scenarios, and thereby assigning relevant coding methods to respective sources based on a ratio of region areas where respective data types appear. As a result, respective sources can be coded in accordance with their data types.

In other words, a multimedia title comprising various kinds of sources and their scenarios is converted into a type of coded video and audio signals following some format such as MPEG. The reproduction terminal thus can be equipped with only a function decoding and reproducing the type of coded video and audio signals.

When converting the edited video signals into the coded video signals such as MPEG, the scenarios contribute to code the signals in a suitable manner for the characteristics of the multimedia title such as kinds of sources, ratios of respective sources making up the title. In this case, the scenarios also contribute to code the signals relevant to data types of respective sources responsive to the regions where different data types are displayed. As a result, coding rate is increased, a number of calculations are decreased, and picture quality is improved because the coding method accommodates respective data types such as text data.

BRIEF DESCRIPTION OF THE DRAWINGS

FIG. 2 is a flowchart illustrating a process-flow performed by a multimedia information coding apparatus.

FIG. 4 is a flowchart depicting a frame analyzing process which creates the information making up the frame.

FIG. 11 depicts an image of a scenario.

FIG. 12 details the image of the scenario.

FIG. 15 depicts an image of helper-file-information for data type adaptive coding.

FIG. 16 depicts an image of control file of quantizer.

FIG. 17 depicts an image of quantization characteristics data adaptive to a data type.

FIG. 25 is an image of an intra-flag-information-file.

FIG. 29 is an image of the escape information file.

FIG. 30 is an image of a quantizer control file in accordance with a fifth exemplary embodiment.

FIG. 31 is an image of matrix information of quantization adaptive to data type.

FIG. 33 is a flowchart illustrating a process of producing a quantizer-control-file by data-type-adaptive-encoder-control-means using a helper file of an encoder adaptive to a data type in accordance with the fifth exemplary embodiment.

FIG. 34 is a block diagram of the encoder adaptive to a data type in accordance with the sixth exemplary embodiment.

DETAILED DESCRIPTION OF THE PREFERRED EMBODIMENTS

Exemplary Embodiment 1

In this first exemplary embodiment, an apparatus converting a multimedia title into a type of coded audio and video signals in accordance with a standard format such as MPEG is demonstrated.

Figure 1:
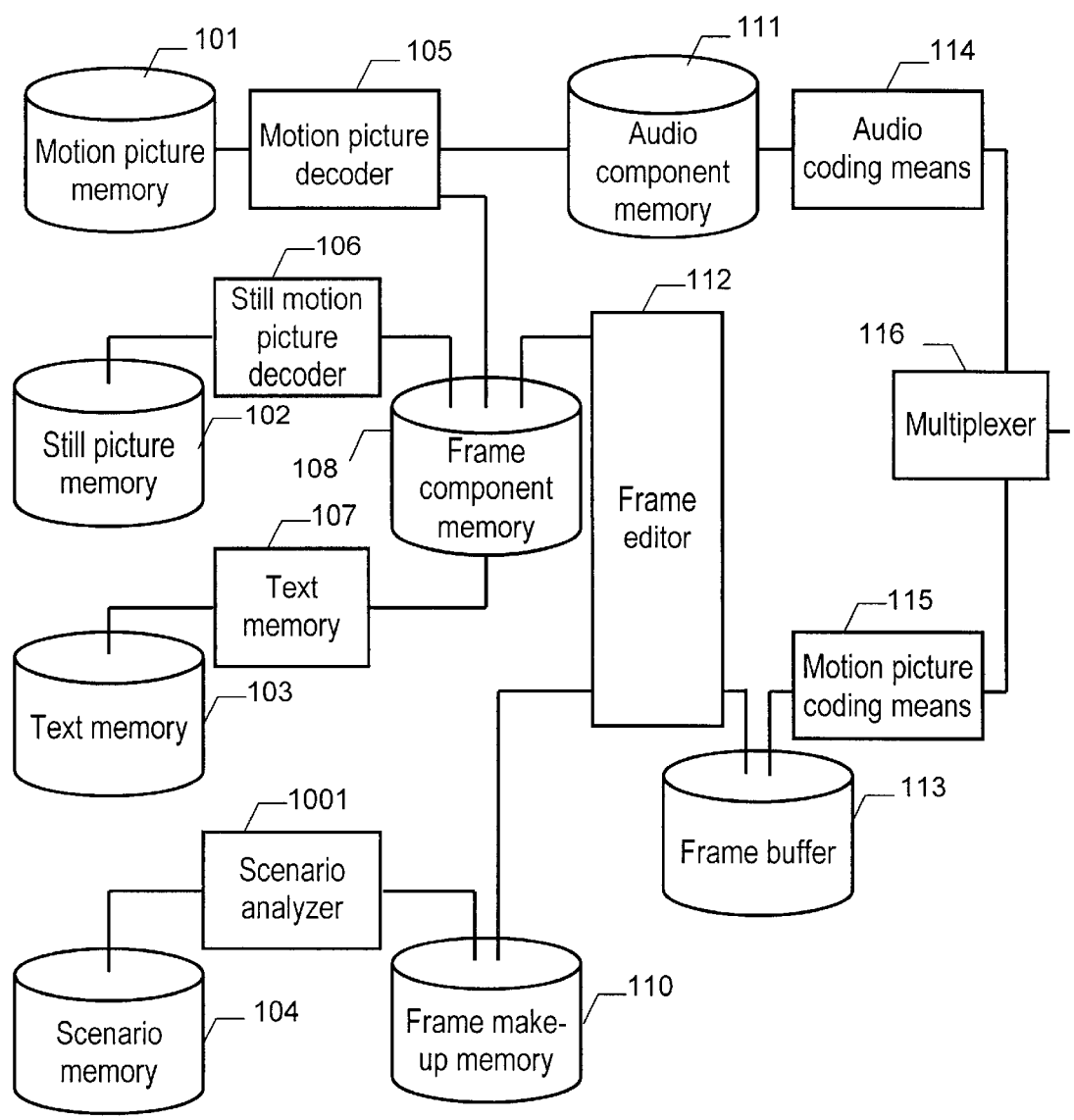
FIG. 1 is a block diagram of an information editor for multimedia in accordance with a first exemplary embodiment of the present invention.

As shown in FIG. 1, motion picture memory 101 stores a source of a motion picture, still picture memory 102 stores a source of a still picture, text memory 103 stores a source of text. Motion picture decoder 105 decodes a motion picture and then reproduces respective frames of audio and motion picture. Still motion decoder 106 decodes a source of a still picture into frame components, and text decoder 107 decodes a character into frame components. Frame component memory 108 stores frame components. The members discussed above and members to be described in the following steps create a type of coded audio and video signals.

The process flowchart of this apparatus is described hereinafter with reference to FIG. 1 and FIG. 2.

Step 11: Scenario analyzer 1001 obtains a scenario stored in scenario memory 104, then creates frame make-up information based on the obtained scenario, and stores the information in frame make-up memory 110.

Step 12: Frame editor 112 instructs motion picture decoder 105, still picture decoder 106 and text decoder 107 to decode respective sources and create necessary components, and then, frames making up one bit stream are created. The frames are stored in frame buffer 113.

Step 13: Motion picture coding means 115 codes the frame data stored in frame buffer 113, thereby producing a coded video stream.

Step 14: Audio coding means 114 codes audio signals of sources stored in audio component memory 111, thereby producing a coded audio stream.

Step 15: Multiplexer 116 multiplexes the coded bit stream and coded audio stream, thereby producing coded audio and video signals.

The following alternatives are available in this process-flow: Step 13 can be processed after Step 14, or both the steps can be started before Step 12 is completed. Thus both the steps can be processed along with Step 12 or both the steps alternate with Step 12, whereby frames and audio components created are sequentially coded.

The features of this apparatus are detailed hereinafter. The apparatus edits and codes a multimedia data including various and plural sources into a type of coded audio and video signals. This is achieved through step 11 (scenario analyzing process) and step 12 (frame editing process). These two steps further detailed hereinafter with reference to FIG. 1 and FIG. 3 through FIG. 9.

Scenario analyzing process:

Information making up a frame is detailed first. This information is a base for frame editor 112 to edit frames, and describes data of sources displayed in respective frames of videos reproduced from the coded audio and video signals supplied from the apparatus.

Figure 3A:
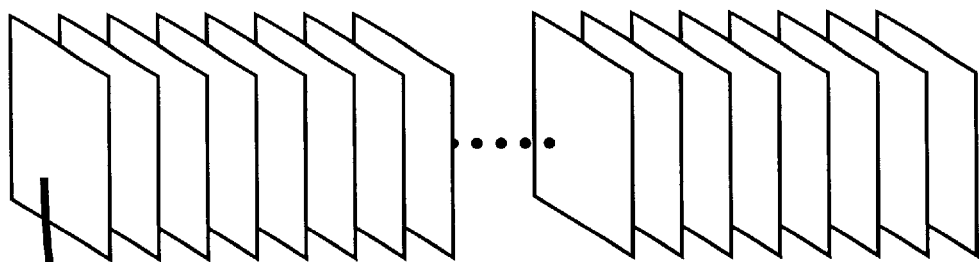
FIG. 3 is a schematic diagram depicting an example of information making up a frame.
Figure 3B:
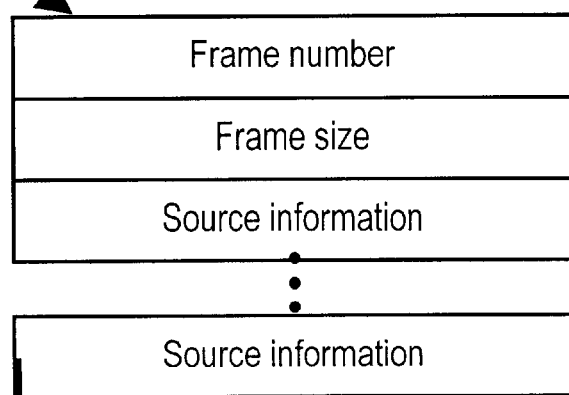
Figure 3C:
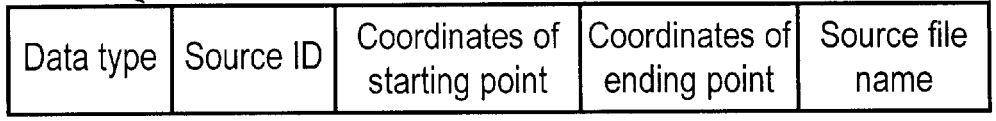

FIG. 3 illustrating an example of frame making-up information which describes the following content:

(A) entire frames, (B) information of each frame, and (C) content of each source included in one frame As shown in FIG. 3, each frame information comprises the following elements:

(a) a frame number indicating the position of the frame from the first frame;

(b) a frame size indicating a number of pixels in vertical and horizontal lines; and (c) source information The source information comprises the following elements:

(1) a data type indicating a type of data, i.e. the source is a motion picture, still picture or text.

(2) a source ID in a title, indicating a value proper to the source;

(3) the coordinates of a staring point (upper left corner) of displaying the source in the frame; and (4) the coordinates of an ending point (lower right corner).

FIG. 4 is a flowchart illustrating an analyzing process of a frame, this process creates the information making up the frame.

Step 1101: Scenario analyzer 1001 reads a scenario stored in scenario memory 104.

Step 1102: Find a number of frames of a title.

Step 1103: Prepare a skeleton, which describes a number of frames up to the total number, in each frame.

Step 1104: End the process if no source is left, which has been described in the scenario but not reflected to the information making up the scenario. If such sources are left, then go to Step 1105.

Step 1105: Scenario analyzer 1001 issues a proper source ID to the sources not reflected yet. Then the analyzer obtains those elements from the scenario such as a data type, the coordinates of starting and ending points in a display region, starting and ending times (indicated with frame numbers), and a source file name.

Step 1106: Scenario analyzer 1001 describes the source information discussed above in the frames bearing respective frame numbers within a time region from display start time to display end time, then checks whether unprocessed sources still remain. If unprocessed sources still remain, repeat the process from Step 1104 and onward.

Figure 5:
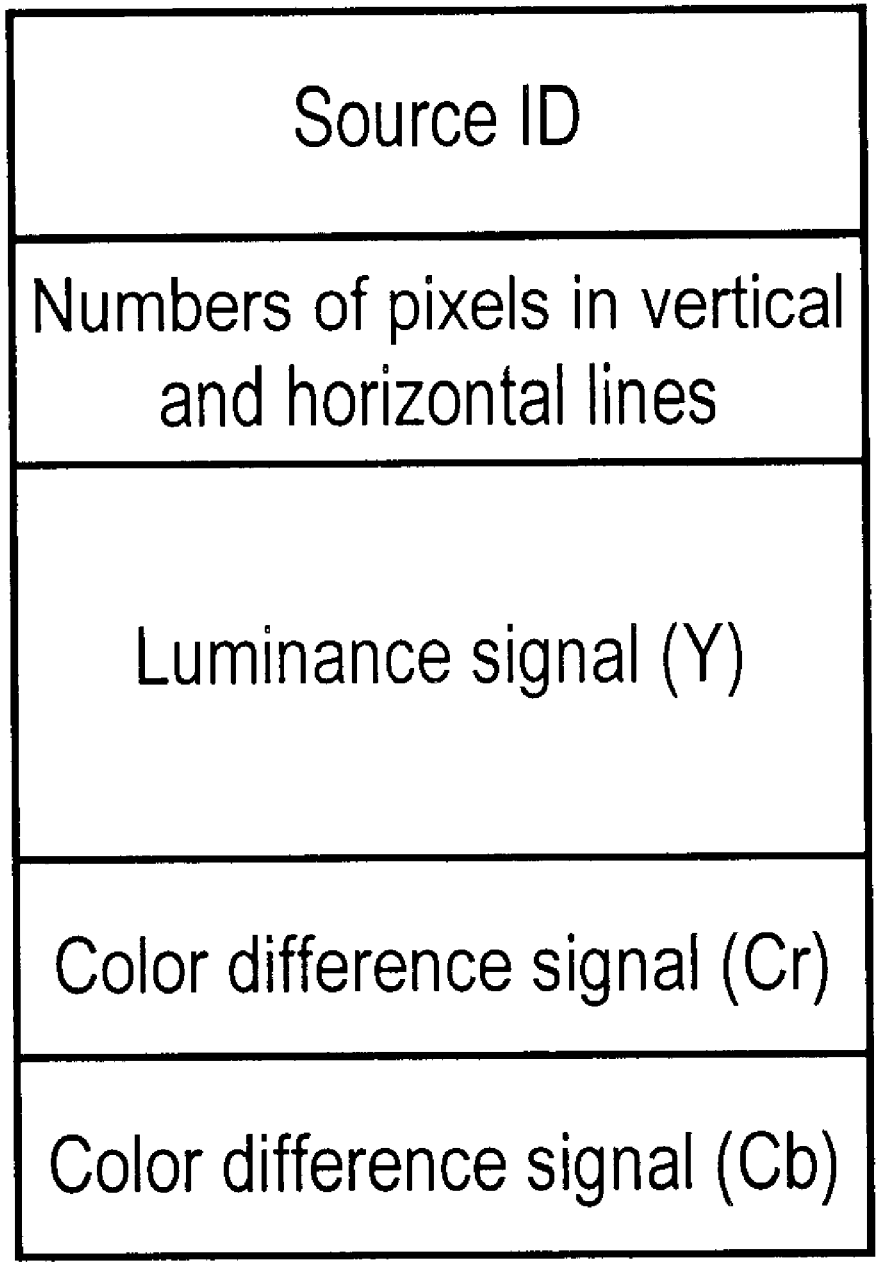
FIG. 5 illustrates components of a frame.

Components making up a frame are described hereinafter. As shown in FIG. 5, the component comprises the following elements:

(a) a source ID;

(b) a number of pixels in vertical and horizontal lines;

(c) luminance signal; and (d) color difference signals

The component has an identical data structure and a video format regardless of types of data such as text, motion picture, or still picture. One kind of video format is used (such as 4:2:2 which motion picture encoder 115 can utilize directly is used.) Thus frames can be edited with ease by using the frame components.

Figure 6:
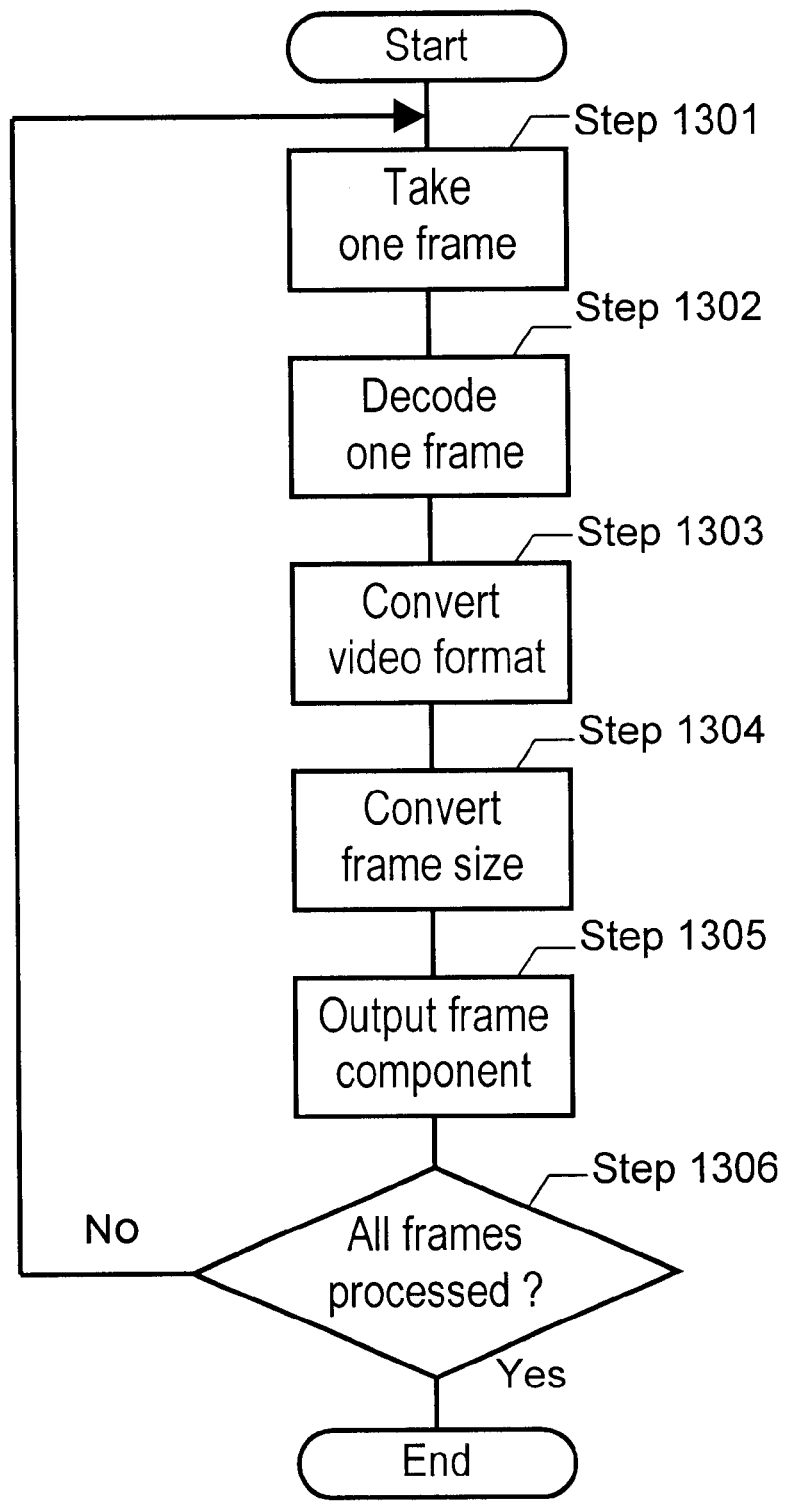
FIG. 6 is a flowchart illustrating a process which creates frame components of a motion picture source.

As shown in FIG. 6, motion picture encoder 105 creates the frame components out of the sources of motion pictures following the processes shown below.

Step 1301: Take one frame of a motion picture source out of the source memory 101 into encoder 105.

Step 1302: Decode the source into frame data, and at the same time, decode audio when the source includes audio, and store it into audio component memory 111.

Step 1303: If the decoded frame data is different from an instructed video format of the frame components, convert it into the instructed one.

Step 1304: If the decoded frame has a size different from an instructed data size, convert it to the instructed one.

Step 1305: Add a source ID to the frame component, and store the component in frame component memory 108.

Step 1306: End the process when all the frames of motion picture sources are processed. If some frames are not processed yet, repeat the process 1301 and onward.

Figure 7:
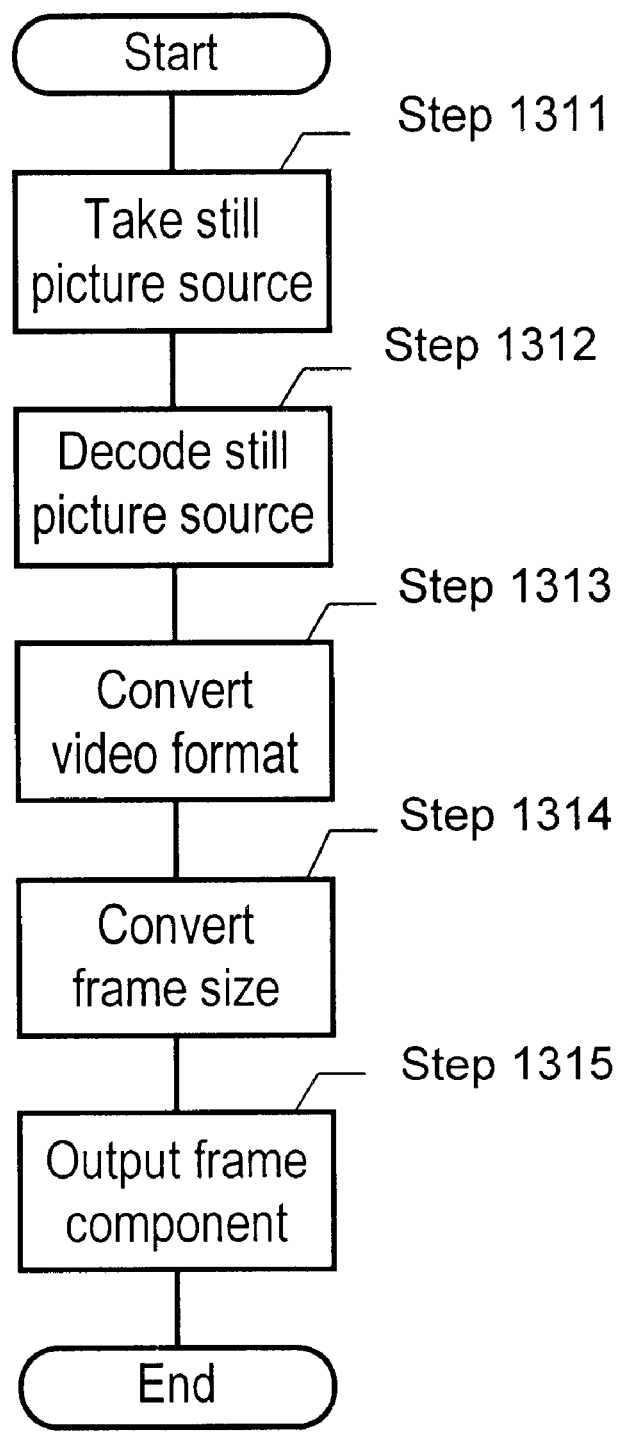
FIG. 7 is a flowchart illustrating a still-picture-decoding-process which creates frame components out of a source of the still picture.

As shown in FIG. 7, still picture decoder 106 decodes a still picture following the steps shown below.

Step 1311: Take a source of still picture out of still-picture-component-memory 102 into decoder 106.

Step 1312: Decode the source into still picture data.

Step 1313: When a video format of the decoded still picture data is different from that of the frame components, decoder 106 converts it to the video format of the frame components.

Step 1314: When the decoded sill picture has a different size from an instructed size, convert it into the instructed size.

Step 1315: Add a source ID to the frame component, and store the component in frame component memory 108.

Figure 8:
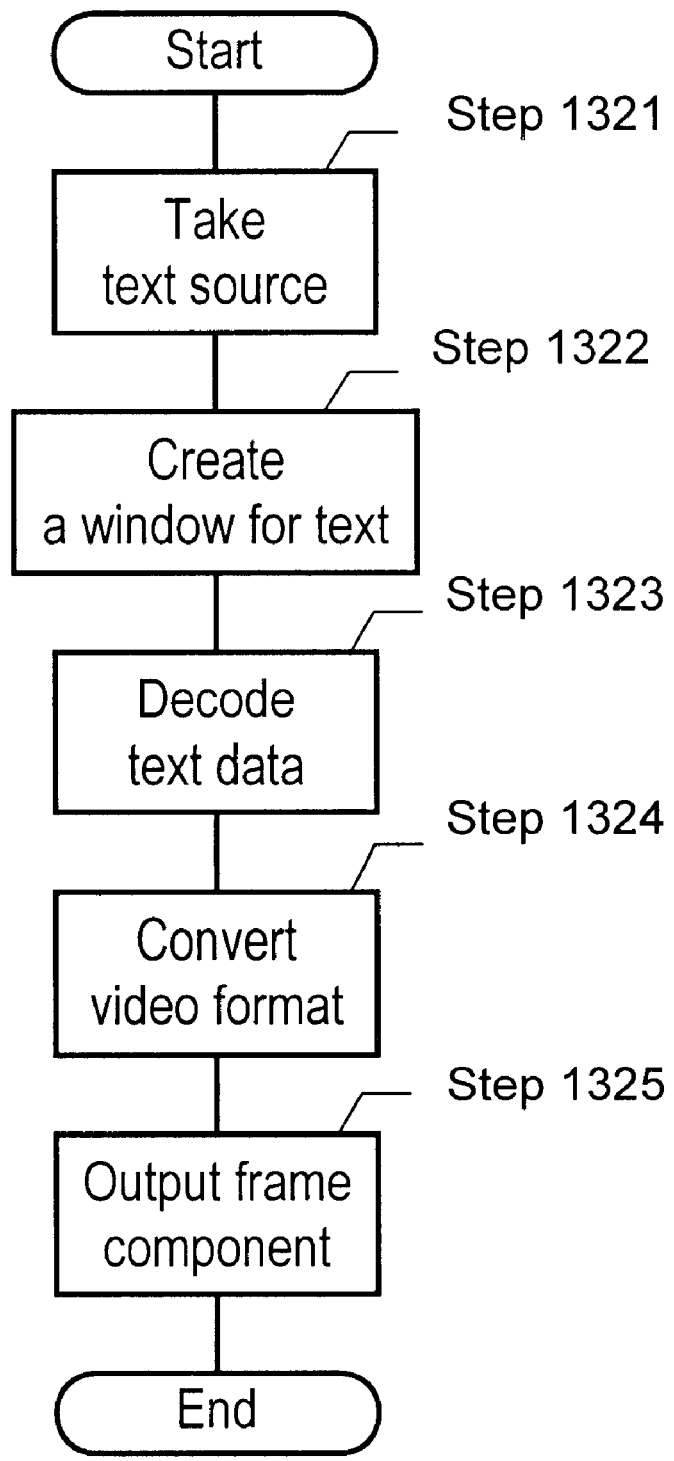
FIG. 8 is a flowchart illustrating a font-decoding-process which creates frame components out of a source of text data.

As shown in FIG. 8, text decoder 107 processes font decoding following the steps shown below.

Step 1321: Take a source of text out of text component memory 103 into decoder 107.

Step 1322: Create a window having an instructed size for decoding text.

Step 1323: Decode the text data on the window, and create bit map data.

Step 1324: Convert a video format of the bit map data into a video format of the frame component.

Step 1325: Add a source ID to the frame component, and store the component in frame component memory 108.

Frame editor 112 instructs the productions of frame components discussed above.

Figure 9:
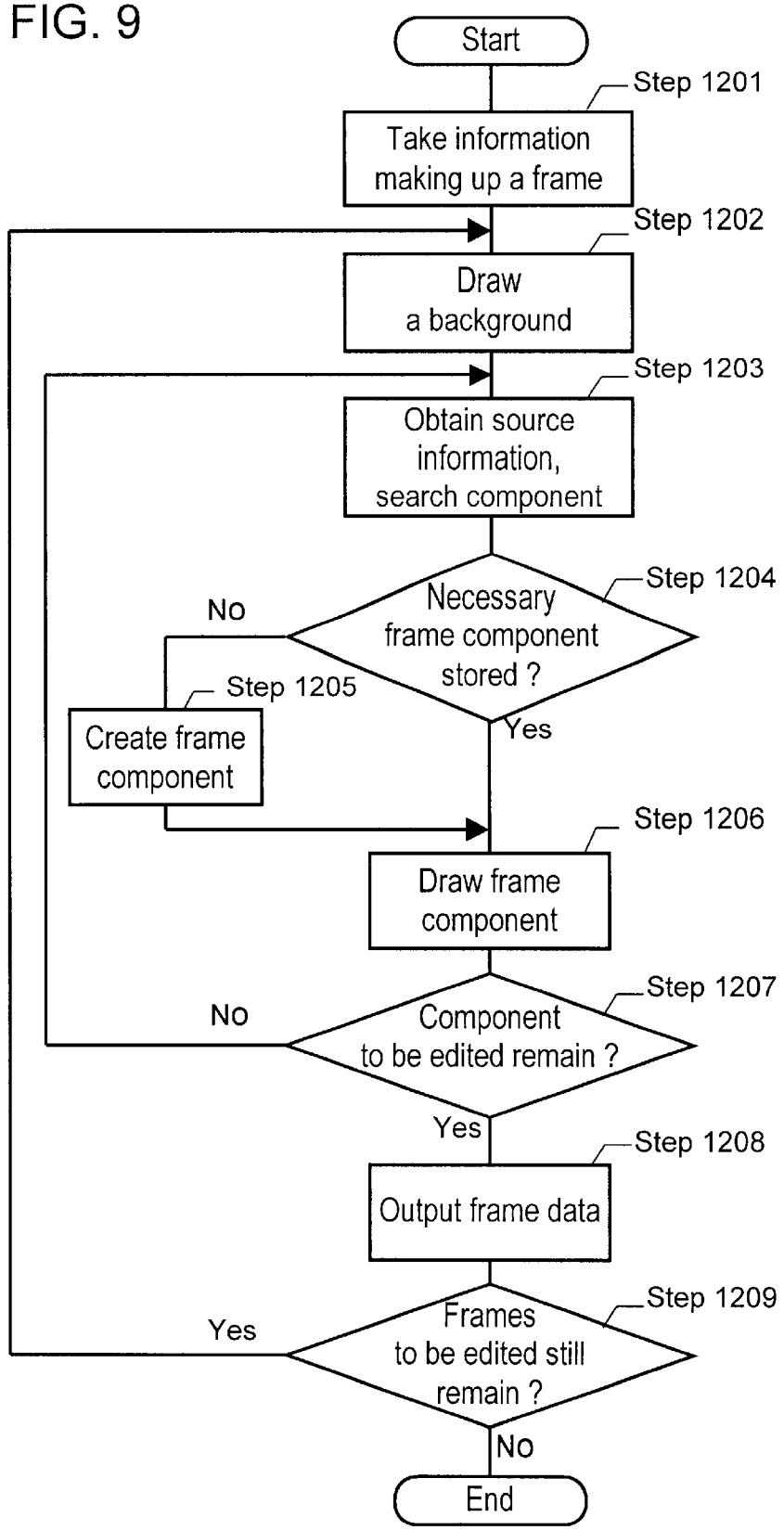
FIG. 9 is a flowchart illustrating a process of frame editing.

Frame editing is detailed hereinafter. As shown in FIG. 9, frame editor 112 edits frames following the steps shown below.

Step 1201: Take the information making up a frame out of frame-makeup-information-memory 10 into frame editor 112.

Step 1202: Draw a background on a frame to be edited.

Step 1203: Obtain information of sources not yet processed in the frame to be edited, and search whether the component with the source ID obtained is stored in frame component memory 108 or not.

Step 1204: When a necessary component is not stored in memory 108, go to Step 1205.

Step 1205: Instruct one of motion picture decoder 105, still picture decoder 106 or text decoder 107 to create a frame component in accordance with the data type described in the source information.

Step 1206: When a necessary component is stored in memory 108, obtain the frame component to be used from frame component memory 111, and draw it on a position described in the source information of the frame.

Step 1207: If frame components to be edited remain in the frame, search the components. (Repeat the processes from Step 1203 and on ward.) Step 1208: If the frame components to be edited do not remain anymore, output frame data to frame buffer 113.

Step 1209: When each frame has been edited, end the process. If a frame to be edited still remains, repeat the process from Step 1202 and onward to edit the remained frame.

The apparatus in accordance with this first exemplary embodiment decodes source data based on information obtained by analyzing a scenario. The various kind of and plural source data as well as the scenario make up multimedia data. The apparatus thus converts the multimedia data into a type of coded audio and video signals such as MPEG 2.

Processes once needed for decoding and displaying various kinds of source data in order to survey multimedia data are thus eliminated in this apparatus. This apparatus needs only processes of decoding and displaying a type of coded audio and video signals such as MPEG in order to survey the multimedia data.

Figure 14:
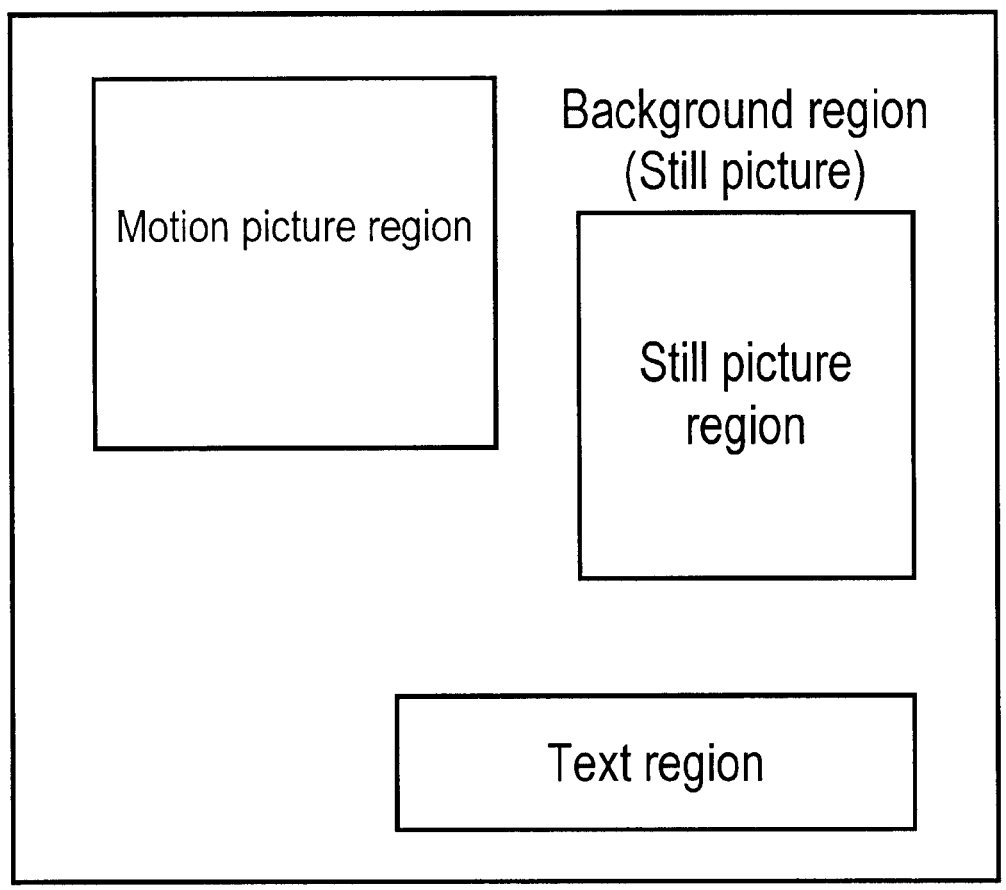
FIG. 14 depicts a rough image of one frame of a multimedia title.

In this embodiment, a motion picture, still picture, text and audio are used as sources to be responsive to a multimedia title as shown in FIG. 14, of which video signals comprises a moving picture, still picture, and text. However, these four sources are not necessarily prepared.

Exemplary Embodiment 2

An apparatus used in the second exemplary embodiment can code sources adaptively to a type of their data in an efficient manner based on information by scenario analysis. This is a function additional to the converting function of multimedia information into coded video signals, which has been discussed in the first exemplary embodiment.

This embodiment demonstrates to code the data adaptively to the data type by controlling a quantizer based on a scenario comprising information about region, time, and data type.

Region information indicates a region where data appears, and the region is usually described by two points on X and Y coordinates.

Time information indicates a time when data appears. The time has a starting and ending points and is usually described by a unit of frame.

Data type information indicates a data type of file which is a source of multimedia information, and it is described as a motion picture type, still picture type or a text type.

Figure 10:
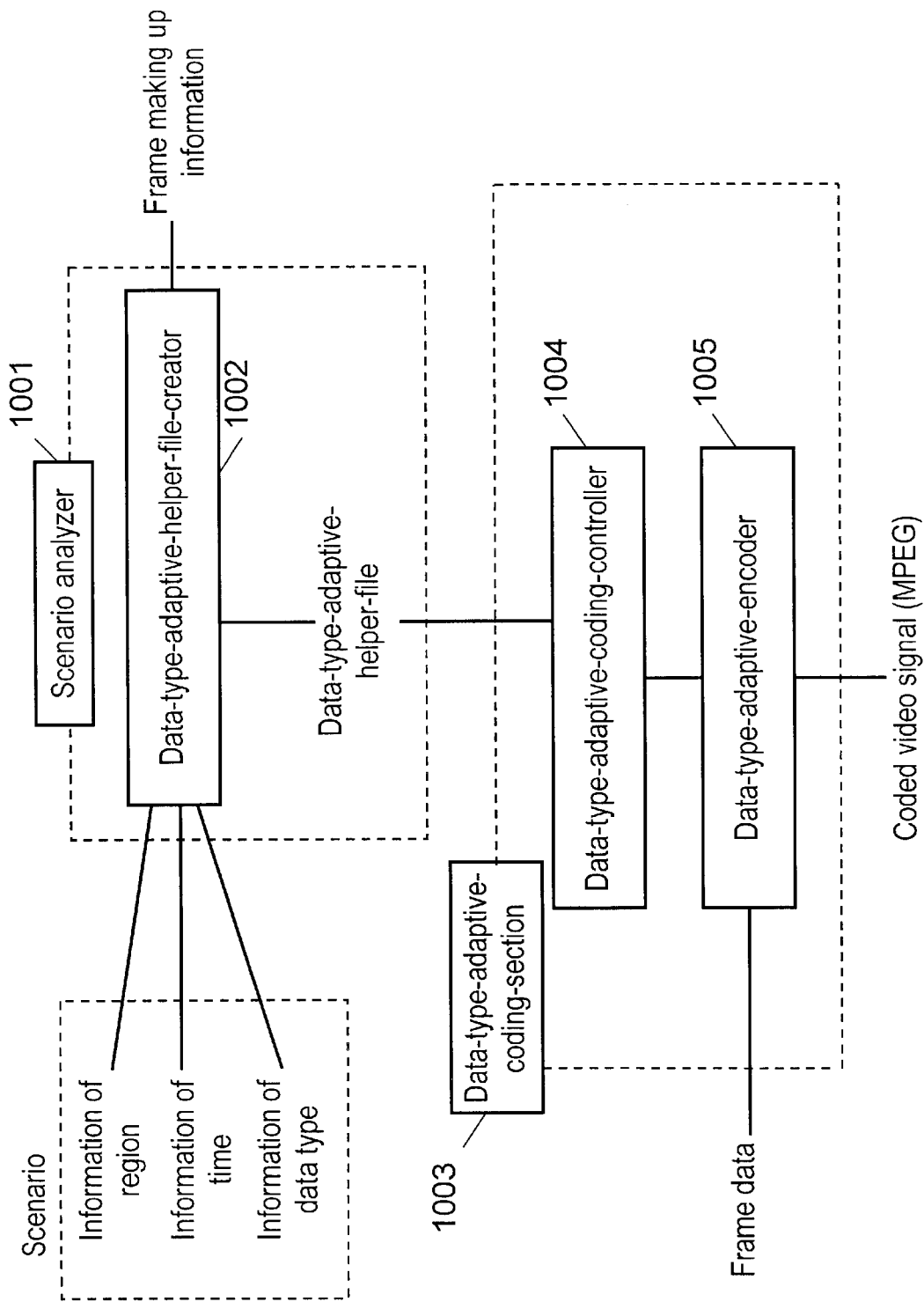
FIG. 10 is a block diagram of an apparatus which analyzes a scenario and thereby producing coded video signals in accordance with the data type of the scenario.

The apparatus in accordance with the second embodiment is constructed as shown in FIG. 10, i.e. scenario analyzer 1001 includes a data-type-adaptive-helper-file-creator 1002 which creates the helper-file by using a scenario comprising the information of region, time and data type. This helper file is shown in FIG. 15 and is used for coding the sources. Data-type-adaptive-coding-section 1003 includes data-type-adaptive-encoder 1005 and data-type-adaptive-coding-controller 1004. Section 1003 codes the sources adaptively to respective data type of the sources.

Figure 13:
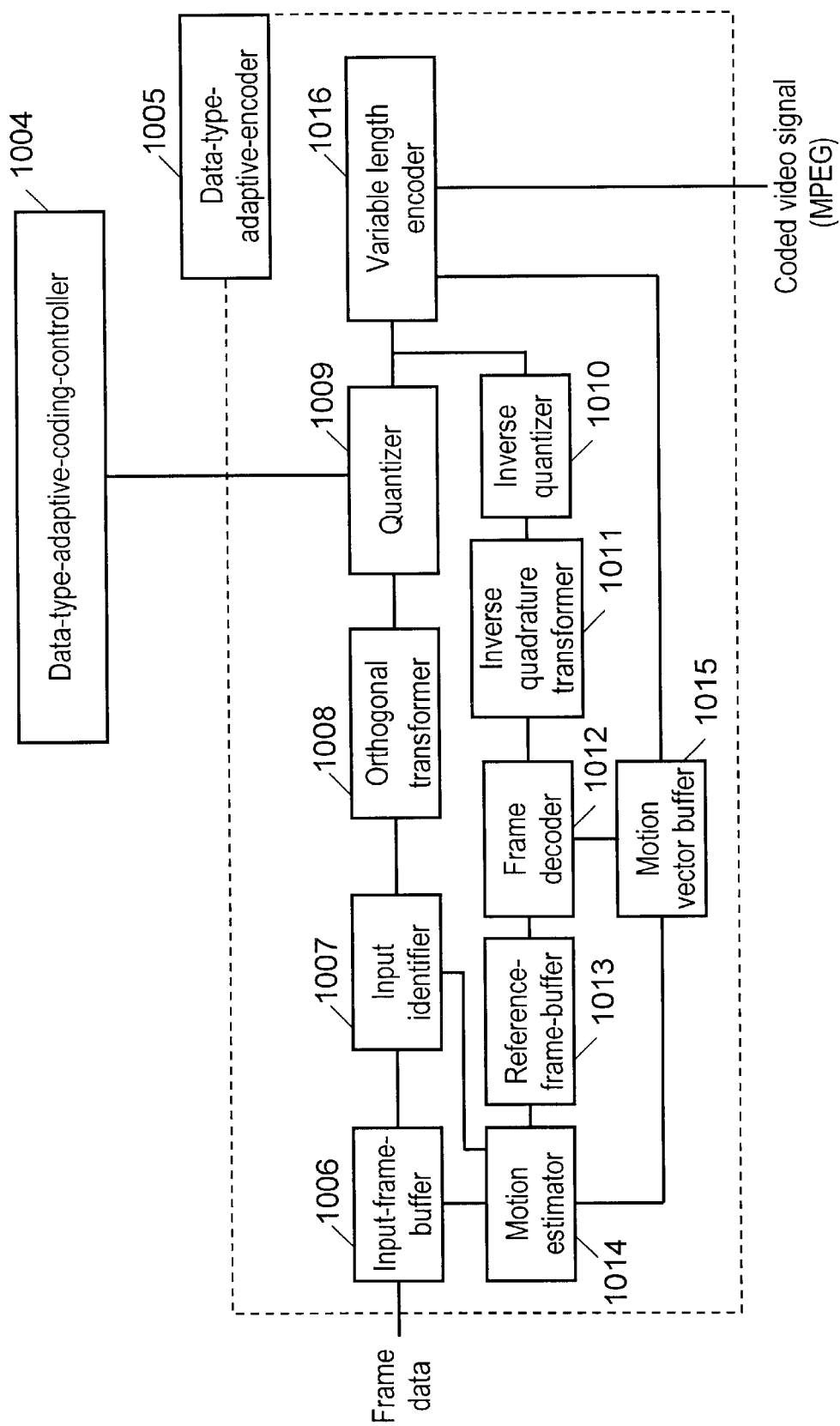
FIG. 13 is a block diagram of an encoder adaptive to a data type used in a second exemplary embodiment.

In encoder 1005 shown in FIG. 13, input-frame-buffer 1006 stores the frame data of a edited frame, and input-signal-identifier identifies a coding type of the frame data supplied whether the coding type is one of I frame, B frame or P frame. Orthogonal transformer 1008 provides the supplied video signals with a discrete cosine transformer (DCT) process. Quantizer 1009 quantizes the input data based on a process mode decided by controller 1004. Inverse quantizer 1010 inversely quantizes the data quantized. Inverse orthogonal transformer 1011 provides the data inversely quantized with an inverse DCT process, thereby producing uncoded video signals.

Frame decoder 1012 decodes a frame based on the data from motion-vector-buffer 1015 and reference-frame-buffer 1013. Reference-frame-buffer 1013 stores the data of a frame decoded by decoder 1012. Motion estimator 1014 follows an identifying by identifier 1007 and estimates a motion based on the data from input-frame-buffer 1006, reference-frame-buffer 1013 and motion vector-buffer 1015. Buffer 1015 stores motion-vector-data created when estimator 1014 estimates motions.

Variable length encoder 1016 codes frame data in a variable length manner, then the frame data has been quantized by quantizer 1009 using the motion-vector-data stored in buffer 1015.

An operation of data-type-adaptive-apparatus thus constructed is described hereinafter with reference to FIG. 11, FIG. 12, FIG. 15, FIG. 16, and FIG. 18 through FIG. 21.

A flowchart of the process by the apparatus used in the second embodiment includes the process described in the first embodiment and a process of coding sources adaptively to their data types.

This process of coding the sources adaptively to their data type can be realized by combining a process by scenario analyzer 1001 and a process by coding section 1003. The process flow is described hereinafter.

Figure 18:
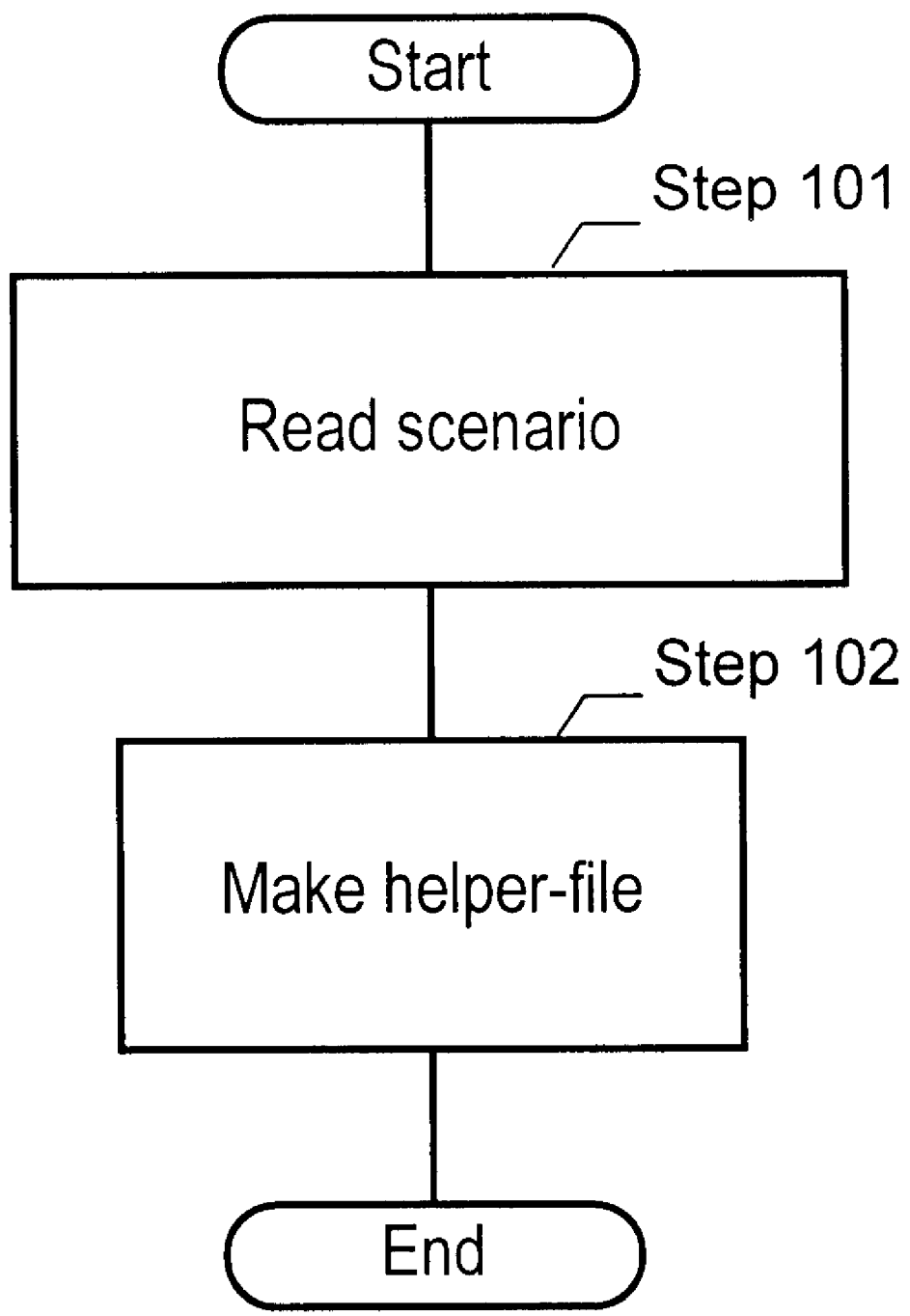
FIG. 18 is a flowchart of a scenario analyzer.

Helper-file-creator 1002 as shown in FIG. 18 analyzes a scenario following the process shown below.

Step 101: Creator 1002 reads the scenario shown in FIG. 11 or detailed in FIG. 12.

Step 102: Create a helper-file as shown in FIG. 15.

Figure 19A:
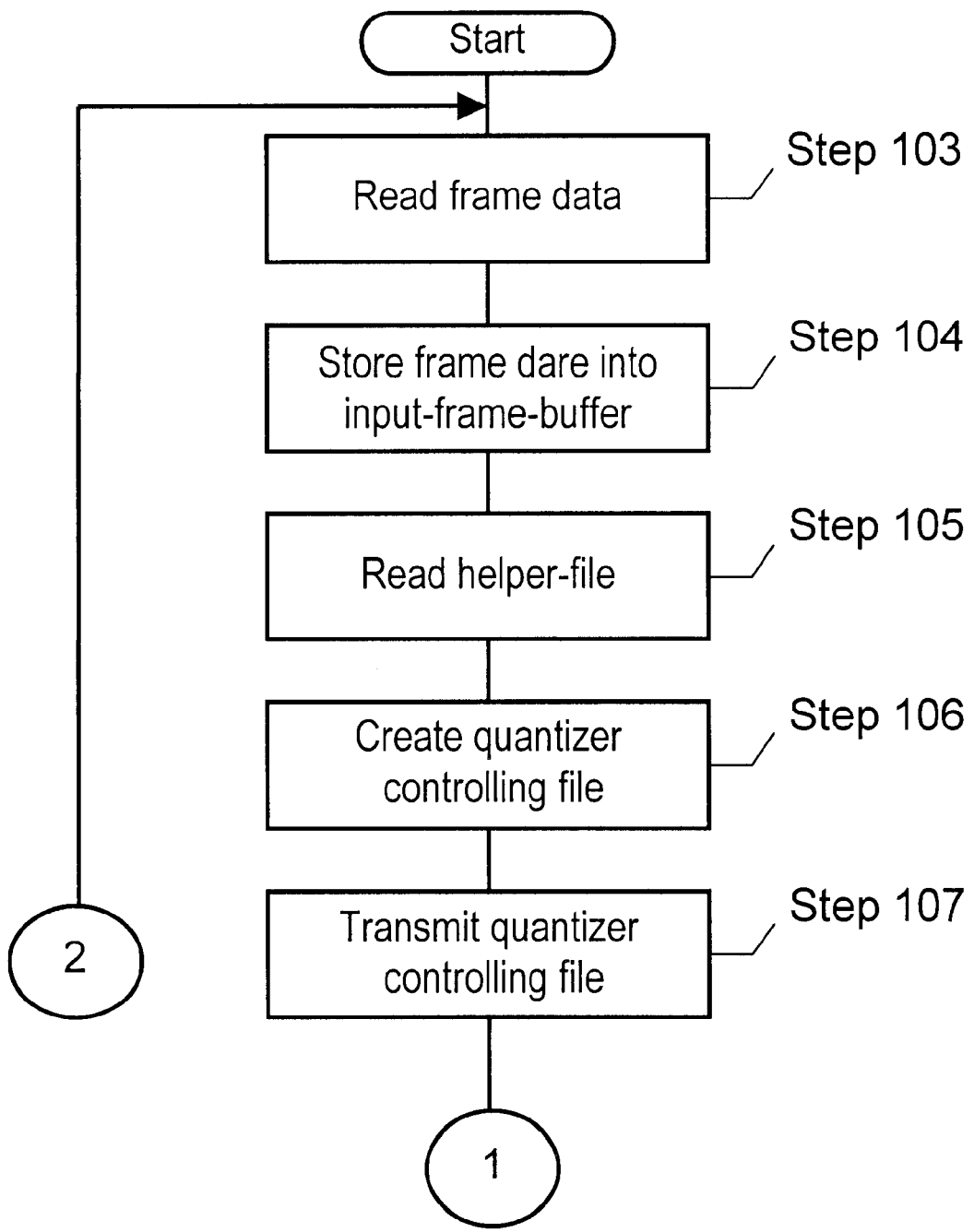
FIG. 19 is a process flowchart of an encoder adaptive to a data type, the encoder controls quantizer.
Figure 19B:
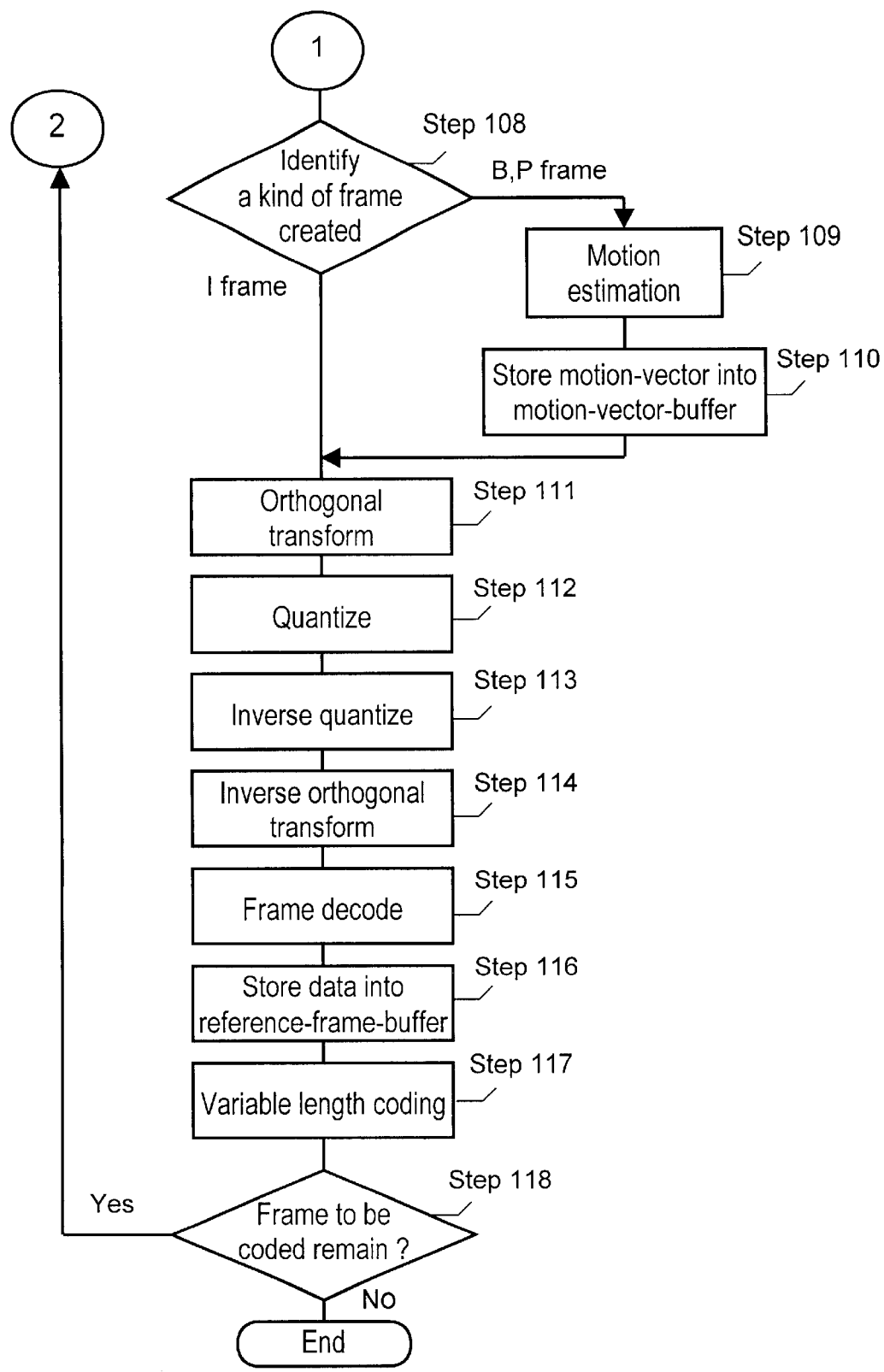

A process by data-adaptive-coding-section 1003 is described in FIG. 19.

Step 103: Section 1003 reads the frame data created in frame editor 112 and stored in frame buffer 113.

Step 104: Store the frame data read by section 1003 into input-frame-buffer 1006.

Step 105: Coding controller 1004 reads the helper-file created in the scenario analyzer.

Step 106: Coding controller 1004 creates quantizer controlling file shown in FIG. 16 based on the helper file shown in FIG. 15.

Step 107: Controller 1004 transmits the quantizer controlling file to data-type-adaptive-quantizer 1009.

Step 108: Input identifier 1007 identifies a frame to be created.

Step 109: If a frame to be created is a predictive frame (P-frame) or bi-directional predictive frame (B-frame), motion estimator 1014 estimates a motion by differentiates between the frame data read by identifier 1007 and the frame data stored in buffer 1013.

Step 110: Motion estimator 1014 stores motion-vector-data into motion-vector-buffer 1015.

Step 111: Orthogonal transformer 1008 transforms the data from identifier 1007 if the frame to be created is an intra-frame (I-frame.) Motion estimator 1014 transforms the data estimating the motions if the frame to be created is a predictive frame (P-frame) or a bi-directional predictive frame (B-frame.) Step 112: Quantizer 1009 has received the controlling file shown in FIG. 16 and created by coding controller 1004. Quantizer 1009 determines quantizing characteristics responsive to a macro block ID, and quantizes the data from transformer 1008 in a unit of macro block.

Step 113: Inverse quantizer 1010 inversely quantizes the data from quantizer 1009.

Step 114: Inverse orthogonal transformer 1011 inversely transforms the data from inverse quantizer 1010.

Step 115: Frame decoder 1012 decodes a frame using the data inversely transformed with reference to reference-frame-buffer 1013 and motion-vector-buffer 1015.

Step 116: Frame decoder 1012 stores data into buffer 1013 in order to estimate a motion.

Step 117: Variable length encoder 1016 codes the data from quantizer 1009 in a variable length manner based on the quantization characteristics.

Step 118: Input identifier 1007 identifies whether a frame to be coded still remains or not. If remains, identifier 1007 reads the frame data created in frame editor 112 (Step 103), and repeat the steps thereafter. If no frame remains, end the process.

As such, the frame data supplied is coded by changing the quantization characteristics responsive to a data type based on the scenario information.

The process of producing the helper-file (step 101 and step 102) based on the scenario information is detailed hereinafter. The process of producing quantizer controlling file (steps 105, 106 and 107) from the helper-file by coding controller 1004 is also detailed hereinafter. The controlling file is specified the quantiziation characteristics in each macro block shown in FIG. 16.

First, the production process of the helper-file based on the scenario information is demonstrated, i.e. the steps 101 and 102 are detailed.

As shown in FIG. 12, the data inside of the scenario comprises the following elements:
(a) frame size information indicated in terms of lengths of X and Y axes;
(b) data type information of respective sources;
(c) time information indicated by a starting and ending times, describing frames where a source appears; and
(d) a region indicated by coordinates of starting and ending points, describing a region within a frame, a source appears in the region.

File creator 1002 creates the helper-file based on the scenario information and the information which makes up the frame. This make-up information has been used for editing the frame discussed in the first embodiment.

As shown in FIG. 15, the helper-file includes the following elements in each frame:
(a) frame size information;
(b) region information;
(c) data type information of respective sources appearing each region; and
(d) flag information indicating a frame where a source firstly appears or not, The helper-file is utilized for data-type-adaptive-coding.

Figure 20:
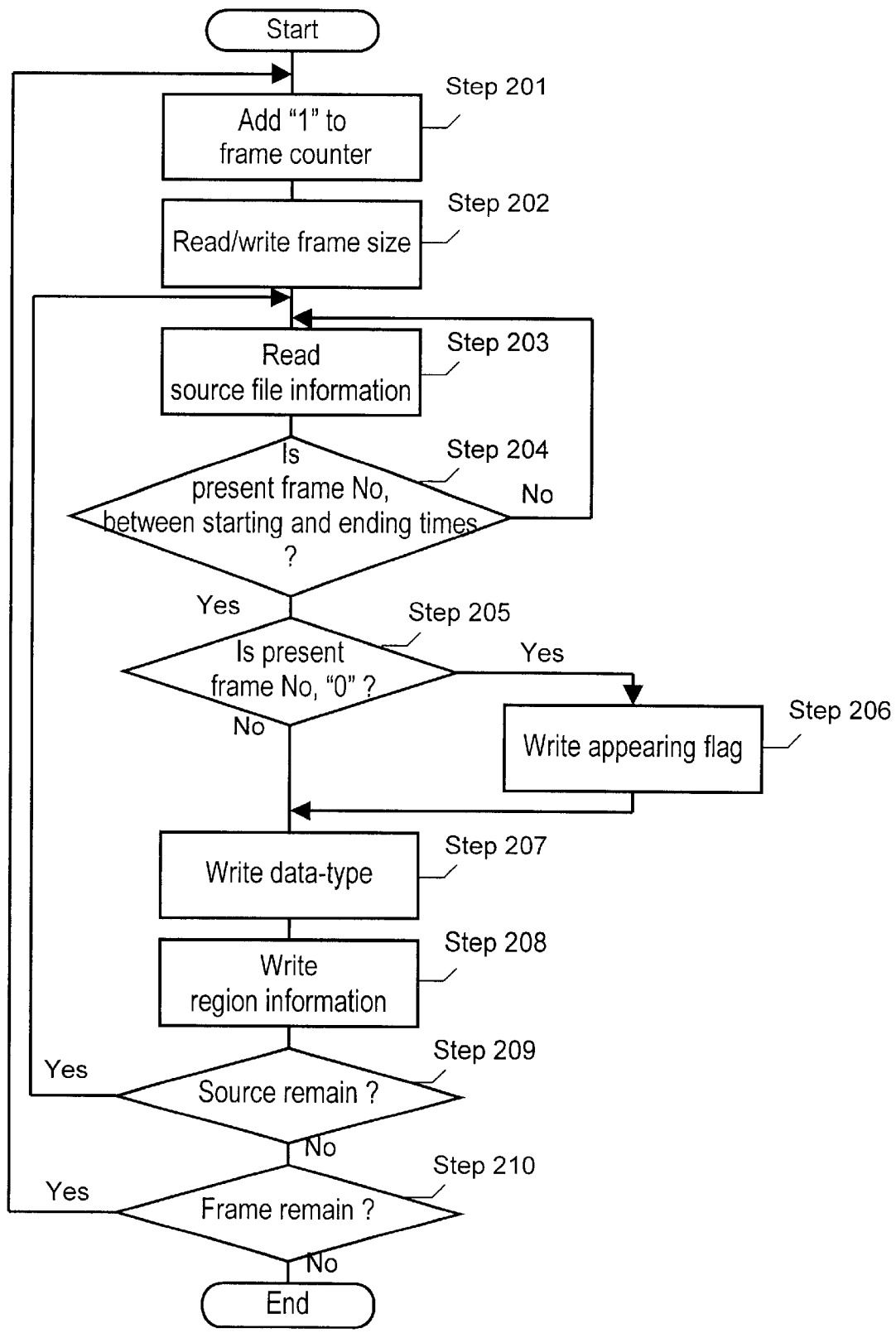
FIG. 20 is a flowchart illustrating that a creator of data-type-adaptive-helper-file creates the file by analyzing a scenario.

As shown in FIG. 20, helper-file-creator 1002 creates the helper-file based on the scenario shown in FIG. 12 and following the process shown below.

Step 201: Add "$^1$i" to a frame counter which has indicated "0" at starting, thereby increasing a frame number by one.

Step 202: Read a frame size and write it into the helper-file.

Step 203: Read the information of the source firstly described in the scenario file.

Step 204: Refer to the time information of the source, and return to step 103 when the present frame No. is not found between the starting and ending times.

Step 205: When the present frame No. is found between the starting and ending times, determine whether the frame No. is "0" (zero) or not.

Step 206: If the present frame No. is "0", write an appearing flag into the helper-file (Step 105).

Step 207: Write the data type information into the helper-file.

Step 208: Write the region information into the helper-file.

Step 209: Determine whether a source to be processed still remains or not. If remains, return to Step 203, and if not, go to Step 210.

Step 210: Determine whether a frame to be processed still remains or not. If remains, return to Step 203, and if not, end the process.

Next, the process of producing quantizer controlling file (steps 105, 106 and 107) from the helper-file by coding controller 1004 is demonstrated hereinafter. The controlling file is allotted with the quantiziation characteristics in each macro block shown in FIG. 16.

Coding controller 1004 refers to data-type-adaptive-quantization-characteristics as shown in FIG. 17 based on the helper file, and creates a macro block ID as well as a quantizer controlling file having quantization characteristics responsive to the macro block ID which is used for putting an ID number to a macro block.

Figure 21:
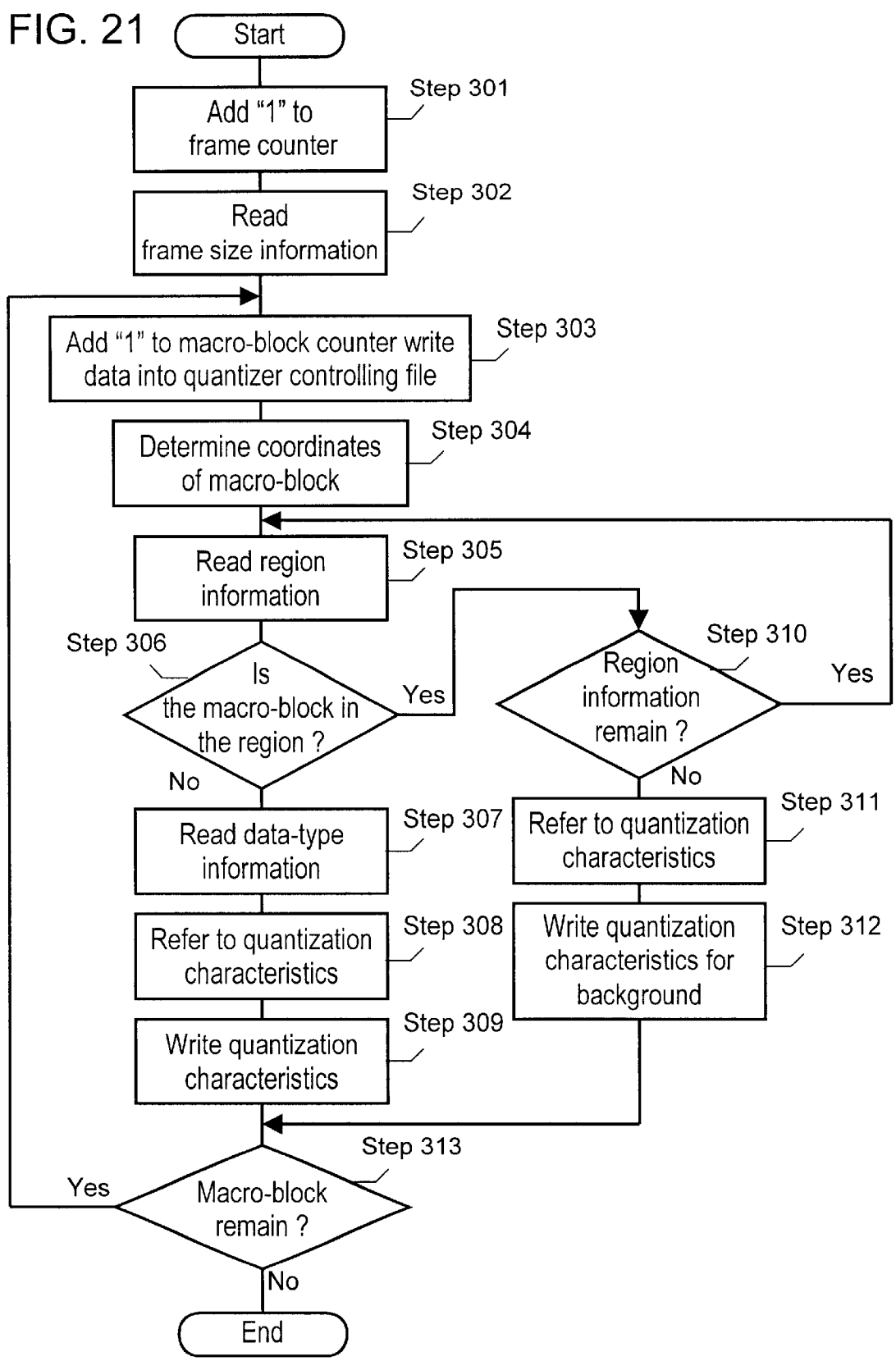
FIG. 21 is a flowchart illustrating a process of producing a quantizer control file by data-type-adaptive-encoder-control-means using a helper-file of an encoder adaptive to a data type.

FIG. 21 illustrates the following process where coding controller 1004 creates a quantizer controlling file from the helper file.

Step 301: Add "1"to the frame counter which has indicated "0" at starting so that the counter number agrees with the frame number.

Step 302: From the helper-file, read the frame size information of the frame of which number agrees with the counter number.

Step 303: Add "1" to a macro block counter ▢ counting a macro block ID of which starting time is indicated "0" ▢ and then write the result into quantizer controlling file.

Step 304: Based on the frame size information read-in, determine the coordinates of macro blocks responsive to each macro block ID.

Step 305: From the helper-file, read the region information within the frame of which No. agrees with the frame counter number.

Step 306: Refer to the region information, and determine whether the macro block is in the region or not.

Step 307: When the macro block is within the region, coding controller 1004 reads data-type information from the helper-file.

Step 308: Refer to the data-type-adaptive-quantization-characteristics shown in FIG. 17.

Step 309: Based on the characteristics, write the quantization characteristics responsive to the data-type information read-in at Step 307 into the quantizer controlling file.

Step 310: When the macro block is outside the region, determine whether other region information is available in the frame of which frame No. agrees with the frame counter No. or not. If available, return to Step 305.

Step 311: When the region information responsive to the macro block does not exist, determine the data-type to be background, and refer to the quantization characteristics.

Step 312: Based on the data-type-adaptive-quantization characteristics, write the quantization characteristics in the case that the data-type is used as background into the quantizer controlling file.

Step 313: Determine whether other macro blocks are available in the region, and when available, return to Step 303. When not available, end the process.

As such, the second embodiment has described an advantage as follows.

A quantizer receives a quantizer controlling file based on an analysis of a scenario, and refers to a quantizer controlling file as well as a macro-block ID that has undergone an orthogonal transforming, and thereby quantizing data with an optimal quantization characteristics. As a result, a source can be coded adaptively to its data type in an efficient manner.

In other words, a region where a still picture appears is quantized for a high quality picture. A region where text data appear is roughly quantized with a large quantization characteristics because color-difference-data is not important. Background is also roughly quantized because it is often painted with simple images having similar colors. A region where graphics appear is quantized with quantization characteristics adaptive to a rough picture because graphics are a kind of still picture, drawn artificially and painted with a few colors.

As such, since the data are quantized adaptively to respective data types, a still picture its picture quality is essential turns out a quality picture even it has the same bit rate as other types of data.

Exemplary Embodiment 3

An apparatus used in the third embodiment has the following features.

When scenario-information indicates that the first frame of a sequence of frames where a source appears is not an intra-frame, data-type-adaptive-encoder 1003 codes a region of the frame where the source appears as an intra-block.

Figure 22:
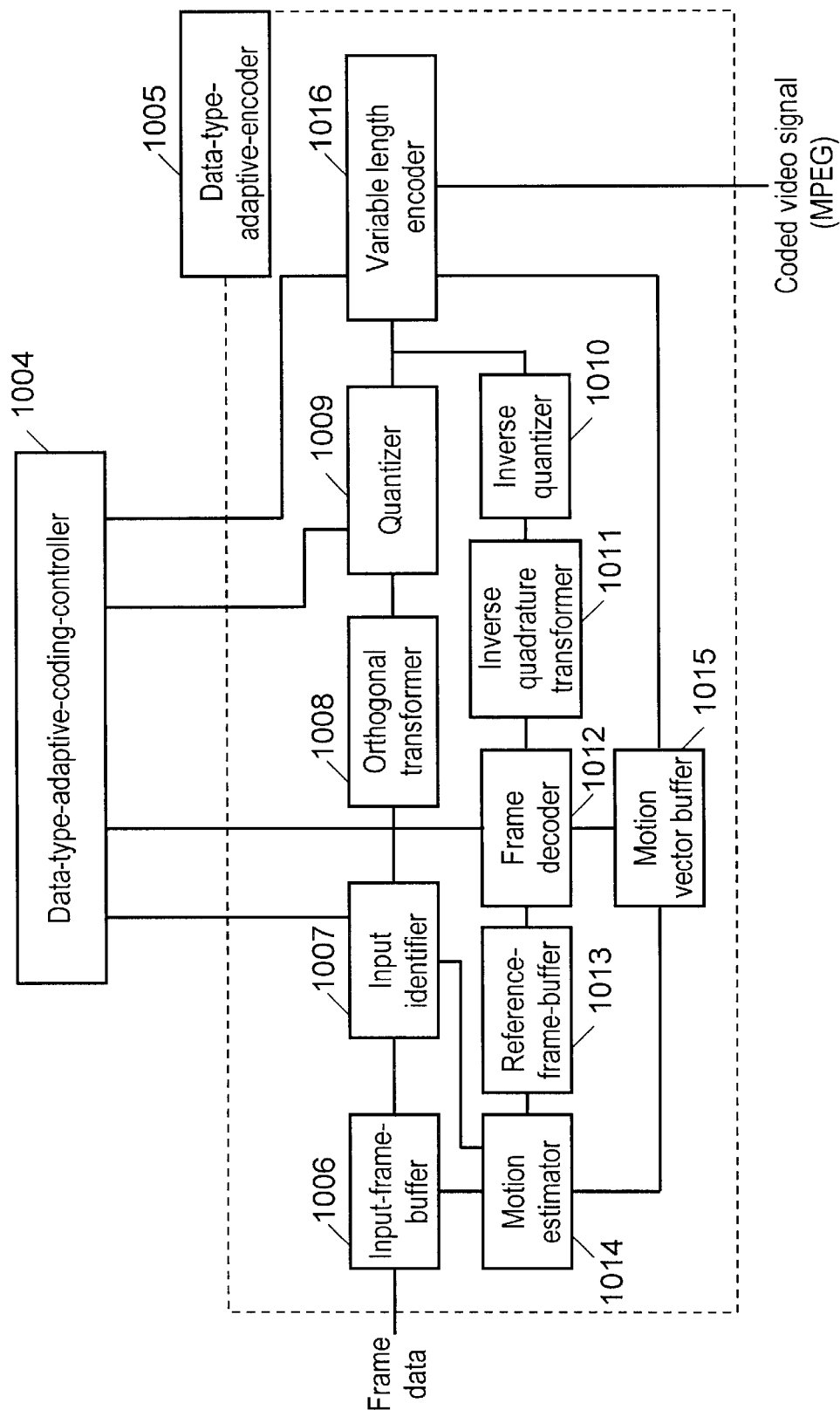
FIG. 22 is a block diagram of an encoder adaptive to a data type used in accordance with a third exemplary embodiment.

A construction of the apparatus used in the third embodiment is the same as the construction that of the second embodiment shown in FIG. 2. FIG. 22 illustrates a structure of encoder 1003, of which elements are the same as those in FIG. 13. Input identifier 1007 used in this third embodiment selects and identifies the block of a region where the source appears the block to be coded an intra-block when scenario-information indicates that the first frame of a sequence of frames where a source appears is not an intra-frame.

Figure 23A:
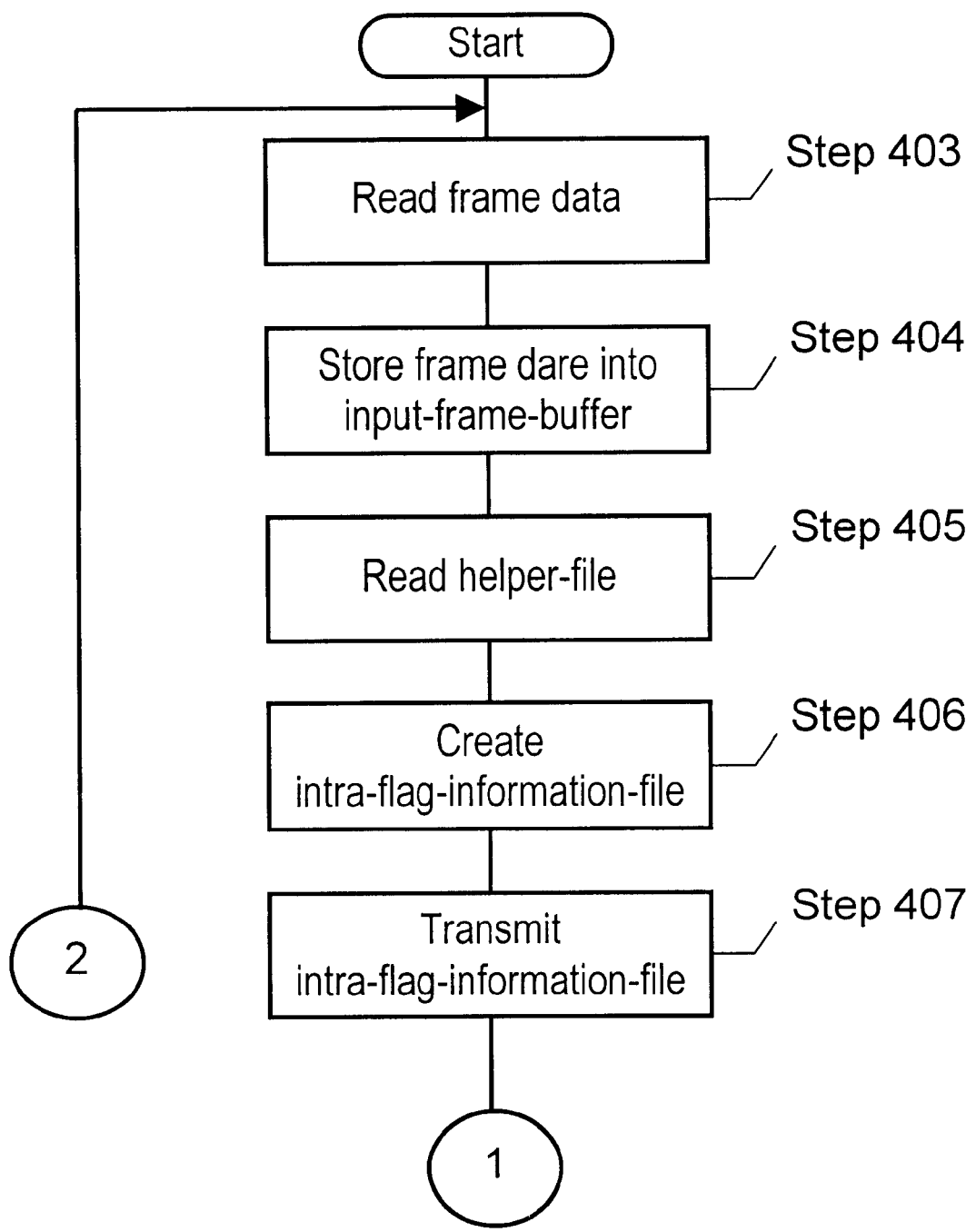
FIG. 23 is a flowchart illustrating a process of the encoder adaptive to a data type in accordance with the third exemplary embodiment.
Figure 23B:
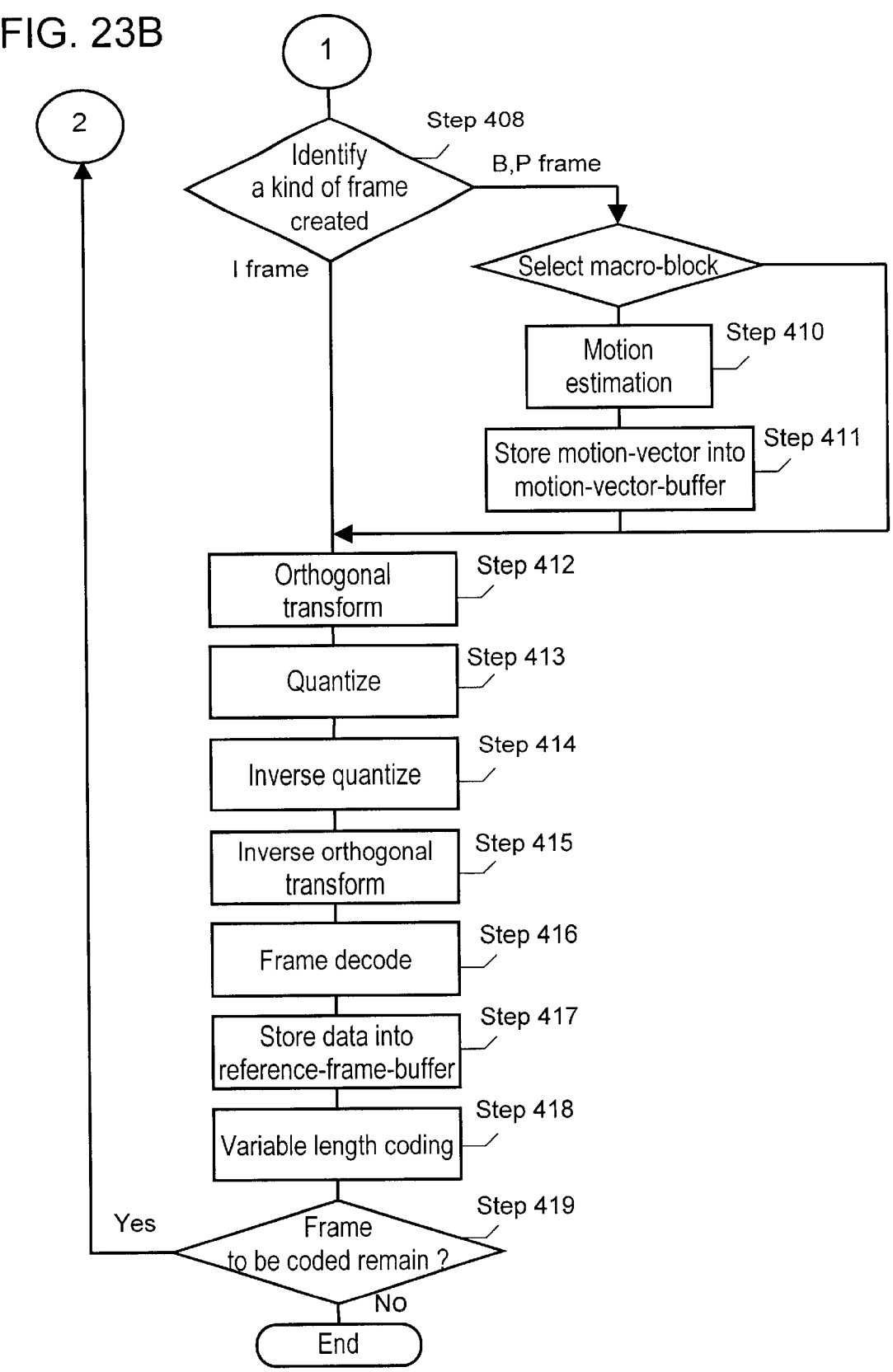

The data-type-adaptive coding apparatus having the construction discussed above is demonstrated hereinafter with reference to FIGS. 23 and 24.

The process in scenario analyzer 1001 is the same as described in the second embodiment shown in FIG. 18.

The process of this third embodiment is realized in this manner, i.e. data-adaptive-coding-controller 1004 controls identifier 1007 based on the data-adaptive-coding-helper-file described in FIG. 15, and the file is created by scenario analyzer 1001.

First, based on the helper-file created by analyzer 1001, the data-type-adaptive-coding section codes the source adaptively to its data-type. The process flowchart in the coding section is described in FIG. 23 with reference to FIG. 22.

Step 403: Read frame-data created by frame editor 112 out of frame buffer 113.

Step 404: Store the data read in at Step 403 into input-frame-buffer 1006.

Step 405: Controller 1004 reads the helper-file.

Step 406: Controller 1004 creates an intra-flag-information-file shown in FIG. 25 based on the helper-file shown in FIG. 15.

Step 407: Controller 1004 transmits the intra-flag-information-file to identifier 1007.

Step 408: Identifier 1007 identifies a kind of frames created.

Step 409: When the frame created is B or P frame, identifier 1007 by referring to the intra-flag-information-file shown in FIG. 25 and transmitted by controller 1004 distinguishes macro-blocks estimating a motion from macro-blocks to be coded intra-blocks.

Step 410: In the case of the macro blocks estimating a motion, motion estimator 1014 estimates a movement with reference to frame data read by estimator 1014 into input-frame-buffer 1006 as well as frame data stored in reference buffer 1013.

Step 411: Estimator 1014 stores motion-vector-information into motion-vector-buffer 1015.

Step 412: (1) When the frame created is I-frame, the data transmitted by identifier 1007 undergoes orthogonal-transform.

(2) When the frame created is B or P frame, and (a) in the case of a macro-block to be coded into an intra-block, orthogonal transformer 1008 transforms the data transmitted by identifier 1007, (b) in the case of a macro-block estimating a motion, transformer 1008 transforms differential motion vector found by estimator 1014.

Step 413: Quantizer 2009 quantizes the data transmitted by transformer 1008.

Step 414: Inverse quantizer 1010 inversely quantizes the data transmitted from data-type-adaptive quantizer 1009.

Step 415: Inverse orthogonal transformer 1011 inversely and orthogonal transforms the data transmitted from inverse quantizer 1010.

Step 416: Frame decoder 1012 decodes the frame from the data inversely and orthogonal transformed with reference to buffers 1013 and 1015.

Step 417: Frame decoder 1012 stores the data into buffer 1013 in order to estimate a motion.

Step 418: Variable length encoder 1016 codes the data transmitted from quantizer 2009 in a variable length manner.

Step 419: Identifier 1007 checks a frame to be coded still remains or not. If remains, identifier 1007 reads the frame data created in frame editor 112 (Repeat Step 403 and onward). If not, end the process.

Second, the detail process is described, where data-type-adaptive-coding-controller 1004 creates the intra-flag-information-file out of the helper-file shown in FIG. 15, i.e. Step 405 and Step 406 are detailed hereinafter.

Out of the helper-file, controller 1004 creates the intra-flag-information-file, which includes the following data: (1) a macro-block ID for numbering the macro-block, and (2) the data distinguishing the macro-blocks to be motion-estimated as an intra-flag from the macro blocks to be coded as an intra-flag, this block is named "1" and that block "0".

Figure 24:
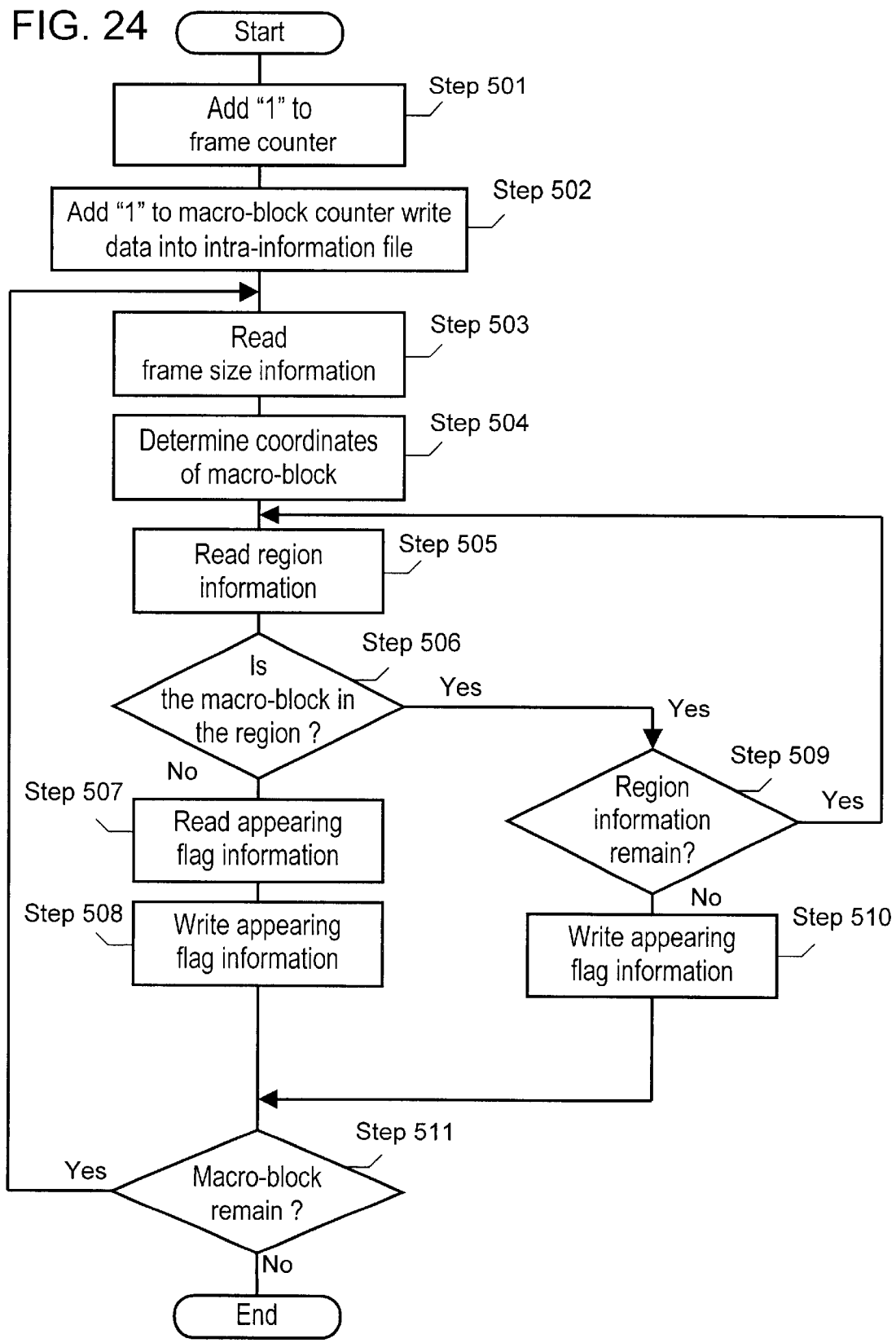
FIG. 24 is a flowchart illustrating a process of producing an intra-flag-information-file by data-type-encoder-control-means in accordance with the third exemplary embodiment using a helper-file of an encoder adaptive to a data type.

Third, a process where controller 1004 creates the intra-flag-information-file out of the data-type-adaptive-coding-helper-file is demonstrated with reference to FIG. 24.

Step 501: Add "1"to a frame counter which shows "0" at starting so that a frame number agrees with the counter number.

Step 502: Add "1" to a macro-block-counter which counts a macro-block ID and shows "0" at starting. Then write the result into the intra-flag-information.

Step 503: From the helper-file, read frame-size-data of which frame number agrees with the counter number.

Step 504: Determine the coordinates of the respective macro-blocks responsive to each macro-block ID based on the frame-size data read in.

Step 505: From the helper-file, read a piece of region information within the frame of which frame number agrees with the counter number.

Step 506: Determine whether the macro-block is within the region or not by referring to the region information.

Step 507: When the macro-block is within the region, read flag-information which indicates a frame where a source firstly appears from the helper-file.

Step 508: Write the flag-information into the intra-flag-information-file.

Step 509: When the macro-block is out of the region, determine whether another region information is in the frame of which frame number agrees with the counter number or not. If the region information exits, return to Step 505.

Step 510: If another region information does not exist, determine that the macro-block is a background, and write the information ▢ the data did not appear firstly in this frame ▢ into the intra-flag-information-file.

Step 511: Determine whether another macro-block exists or not. If exists, return to Step 503, and if not, end the process.

This third embodiment as discussed above proves the following advantage. Among a sequence of frames where a source appears, the first fame is not an intra-frame, the region where the source appears is coded as the intra-block. Although this frame thus has a higher probability that an image totally different from that of the previous frame appears, amount of calculation is reduced than it is required in estimating a motion, and also picture quality is improved.

Among a sequence of frames where a source appears, input identifier 1007 of the present invention codes the first frame into I-frame.

On the other hand, among a sequence of frames where a source appears, input identifier 1007 of the present invention codes the first frame into P frame and codes the region, where the source is displayed, into an intra-block.

Among a sequence of frames where a source appears, when the first frame is B frame, the region of B frames up to coming intra-frame or P frame can be coded as intra-blocks. In this case, when the frame other than B frame after the first frame is P frame, the region where the source appears is coded as an intra-block.

Exemplary Embodiment 4

An apparatus used in the fourth embodiment codes a source based on scenario information as follows.

(1) Frames where a still picture and/or text data are displayed, i.e. data free from time-varying is displayed:

Code the macro-blocks making-up the region where the source appears as the macro-blocks at the same location in the previous frame. Escape information is thus indicated that these macro-blocks are identical to those of the previous frame, and these macro-blocks are treated escape-macro-blocks.

An entire construction of the apparatus used in this fourth embodiment is the same as that described in the second embodiment.

Figure 26:
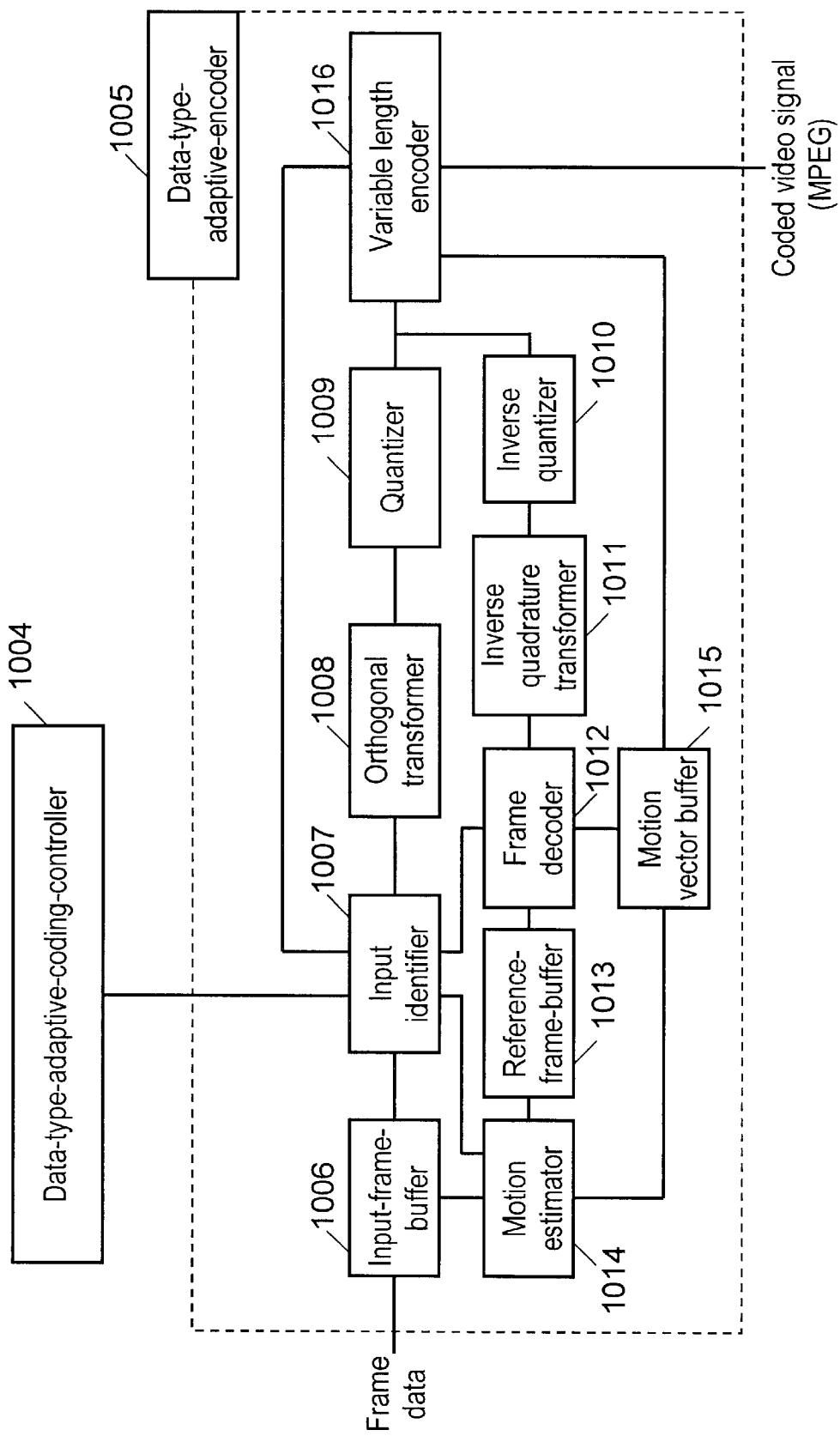
FIG. 26 is a block diagram of an encoder adaptive to a data type in accordance with the fourth exemplary embodiment.

The elements of data-type-adaptive-coding section shown in the block diagram in FIG. 26 are the same those in FIG. 13.

Input identifier 1007 used in this fourth embodiment specifies the blocks in the region where the data of the frames to be escape-macro-blocks-blocks indicating that these blocks have the same data as those macro-blocks at the same location of the previous frame. These frames can be specified during the period any frames following the first frame among a sequence of frames where a source such as still picture or text data free from time-varying appears ▢ is displayed.

An operation of the data-type-adaptive coding apparatus having the construction discussed above is demonstrated hereinafter with reference to FIGS. 26, 27 and 28.

The process flowchart of scenario analyzer is the same as discussed in the second embodiment and shown in FIG. 18.

Data-type-adaptive-coding-controller 1004 shown in FIG. 22 controls input identifier 1007 based on a data-type-adaptive-coding-helper-file, thereby achieving the process of this fourth embodiment.

Figure 27A:
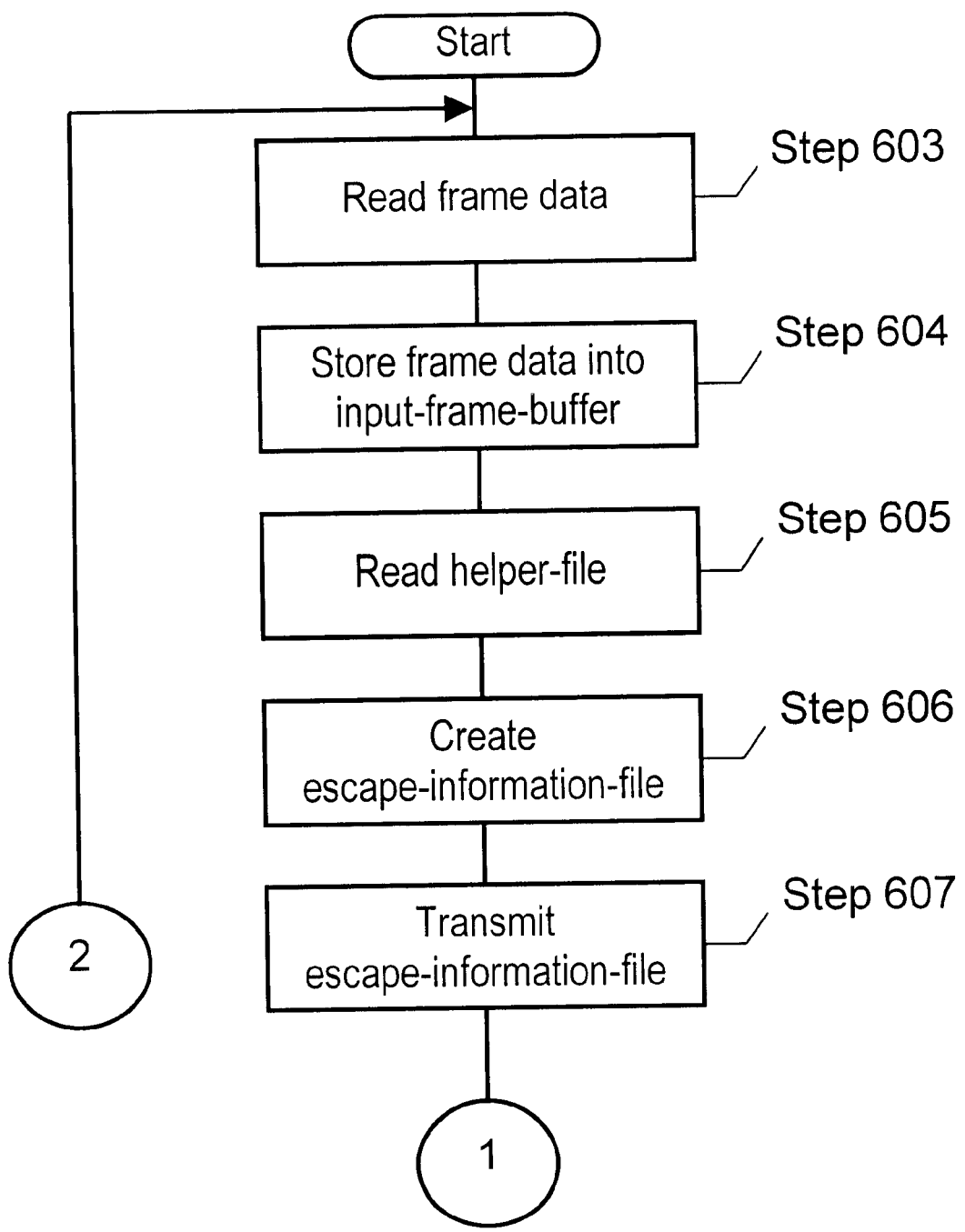
FIG. 27 is a flowchart illustrating a process of the encoder adaptive to a data type in accordance with the fourth exemplary embodiment.
Figure 27B:
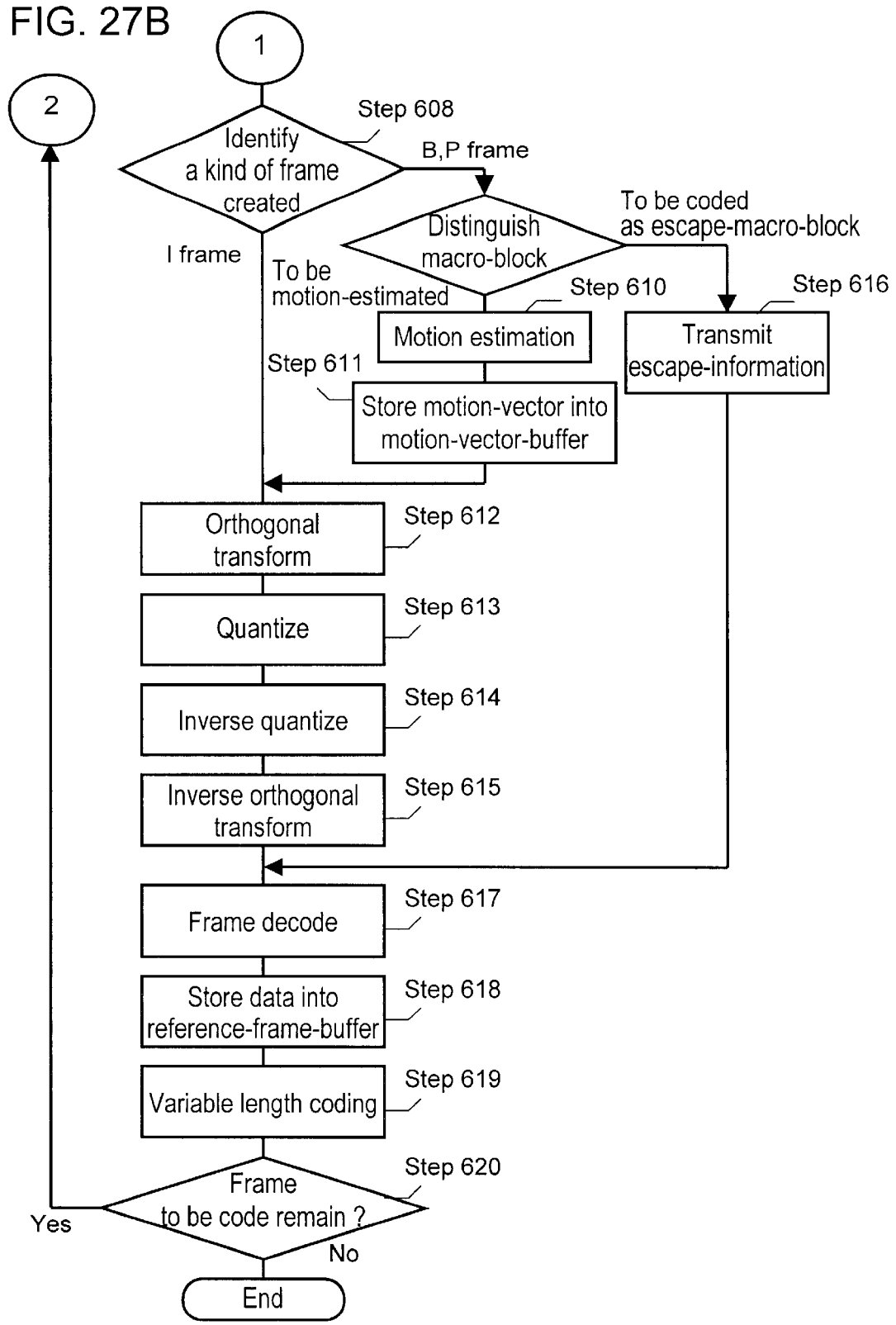
Figure 28A:
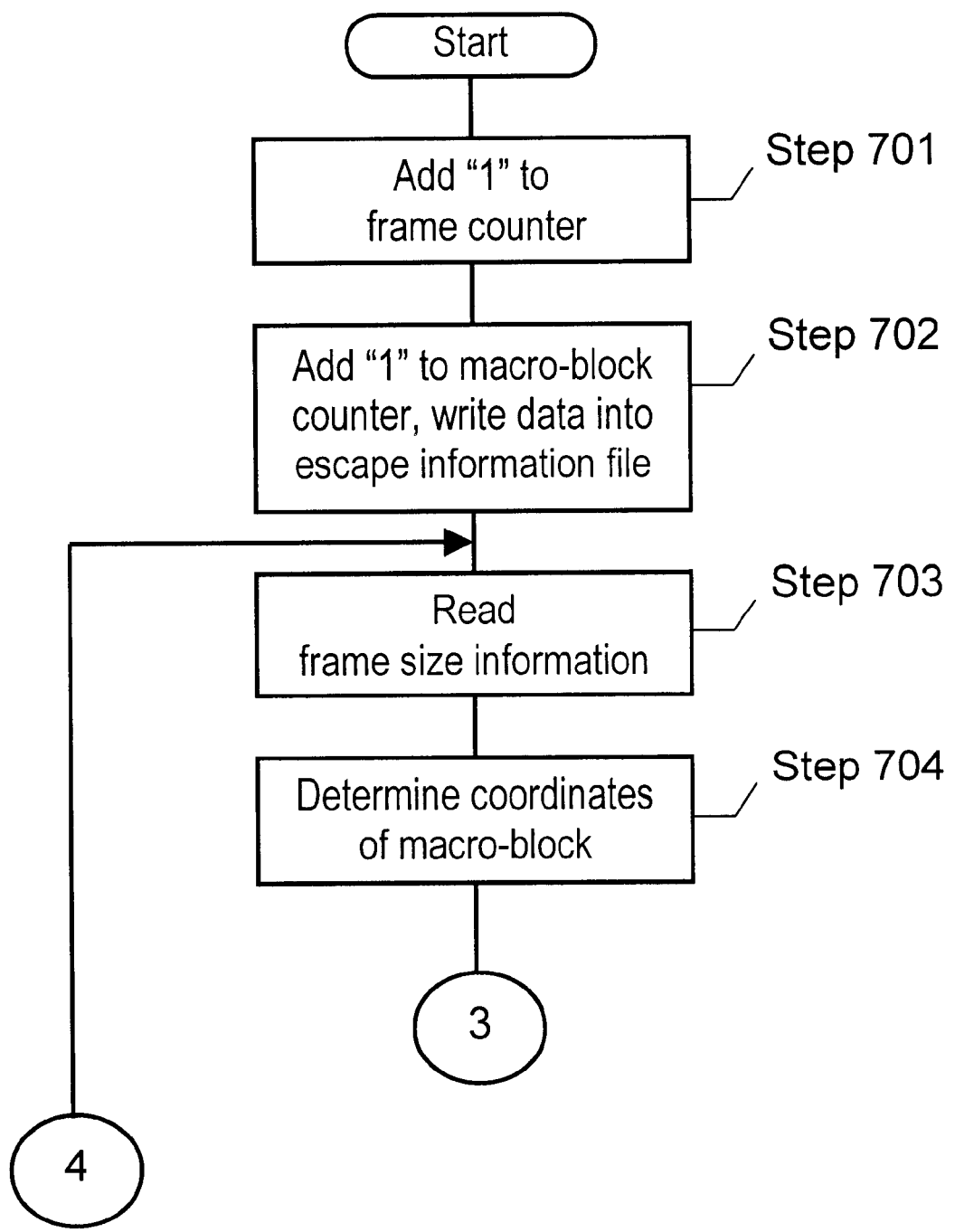
FIG. 28 is a flowchart illustrating a process of producing an escape-information-file by data-type-encoder-control-means using a helper file of an encoder adaptive to a data type.
Figure 28B:
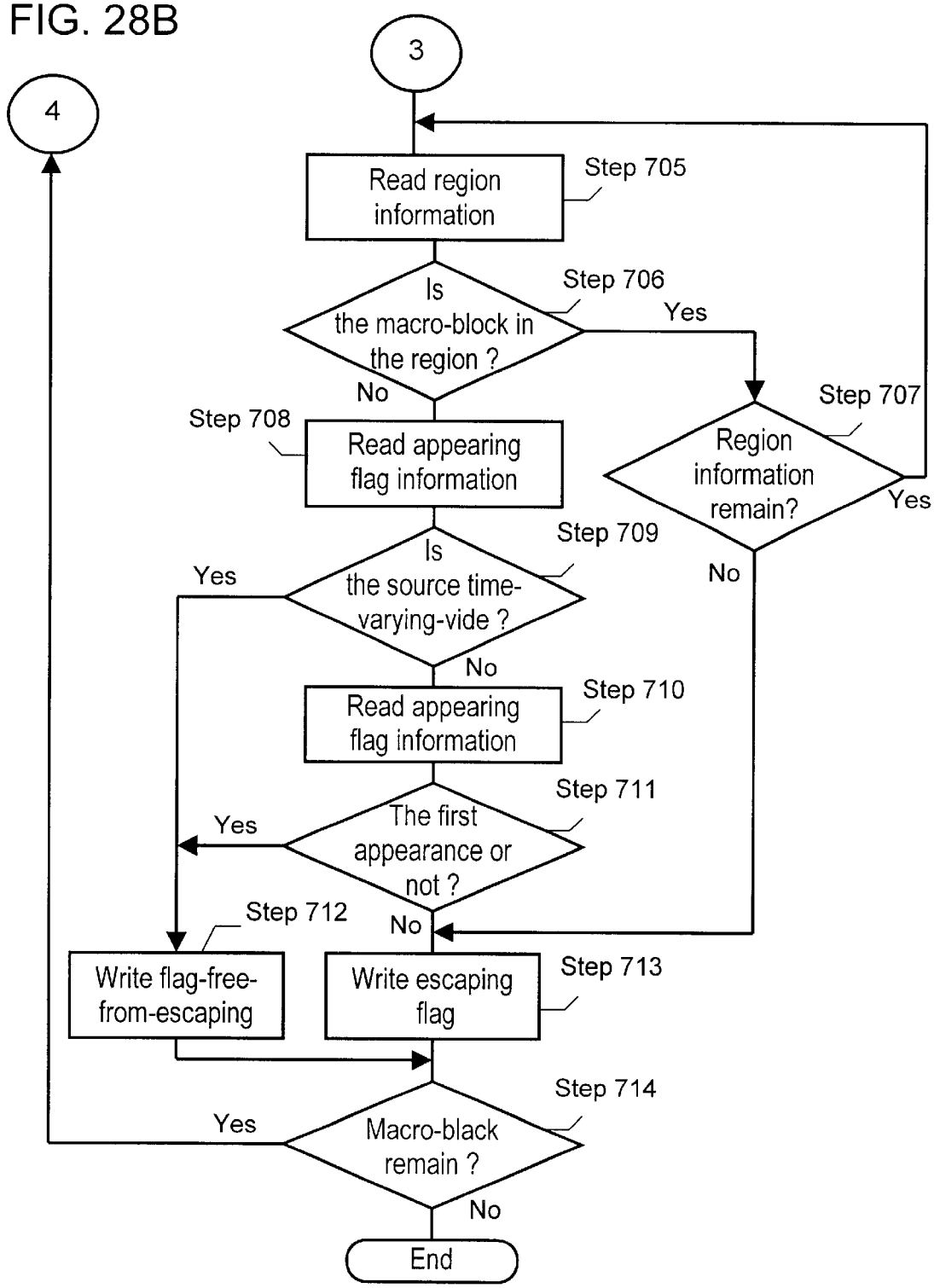

The process flowchart by a data-type-adaptive-coding section is demonstrated with reference to FIG. 26 and FIG. 27.

Step 603: From frame-buffer 113, read frame-data created in frame editor 112.

Step 604: Store the data read in at Step 603 into input-frame-buffer 1006.

Step 605: Controller 1004 reads the helper-file.

Step 606: Controller 1004 creates an escape-information-file shown in FIG. 29 based on the helper-file shown in FIG. 15.

Step 607: Controller 1004 transmits the escape-information-file to identifier 1007.

Step 608: Identifier 1007 identifies a kind of frames created.

Step 609: When the frame created is B or P frame, identifier 1007▢by referring to the escape-information-file shown in FIG. 29 and transmitted by controller 1004 distinguishes macro-blocks to be motion-estimated from macro-blocks to be coded as escape-macro-blocks.

Step 610: In the case of the macro blocks to be motion-estimated, motion estimator 1014 estimate a motion with reference to frame data stored into input-frame-buffer 1006 as well as frame data stored in reference buffer 1013, i.e. estimator 1014 calculates the difference between these two frame data.

Step 611: Estimator 1014 stores motion-vector-information into motion-vector-buffer 1015.

Step 612: (1) When the frame created is I-frame, the data transmitted by identifier 1007 undergoes an orthogonal-transform.

(2) when the frame created is B or P frame, and in the case of a macro-block to be motion-estimated, orthogonal transformer 1008 transforms orthogonal the data estimated by estimator 1014.

Step 613: Quantizer 2009 quantizes the data transmitted by transformer 1008.

Step 614: Inverse quantizer 1010 inversely quantizes the data transmitted from data-type-adaptive quantizer 1009.

Step 615: Inverse orthogonal transformer 1011 inversely and orthogonal transforms the data transmitted from inverse quantizer 1010.

Step 616: When B or P frame is to be created and is coded as an escape-macro-block, input identifier 1007 transmits the information the macro-block is an escape-macro-block to both variable length encoder 1016 and frame decoder 1012.

Step 617: Frame decoder 1012 refers to reference-frame-buffer 1013 and motion-vector-buffer 1015 based on the escape-macro-block-information as well as the data inversely and orthogonal transformed, thereby restoring the frame.

Step 618: Frame decoder 1012 stores the data into the reference buffer 1013 in order to estimate a motion.

Step 619: Variable length encoder 1016 codes the two kinds of data in a variable length manner. One of the two kinds of data is the escape information transmitted by identifier 1007, and the other one is the data orthogonal transformed as a macro-block free from escaping by transformer 1008 and transmitted by quantizer 2009. These two kinds of data are coded provided the escape information is embedded into a header of the macro-block free from escaping, this macro-block firstly coming after the macro-block escaping.

Step 620: Identifier 1007 checks a frame to be coded still remains or not. If remains, identifier 1007 reads the frame data created in frame editor 112 (Repeat Step 603 and onward). If not, end the process.

Next, the detail process is described, where data-type-adaptive-coding-controller 1004 creates the escape-information-file out of the helper-file shown in FIG. 15, i.e. Step 605 and Step 606 are detailed hereinafter.

Out of the helper-file, controller 1004 creates the escape-information-file, which includes the following data: (1) a macro-block ID for numbering the macro-block, and (2) the data distinguishing the macro blocks estimating a motion as an escape-information-insertion-flag from the macro blocks to be coded as an escape-macro-block, this block is named "1"and that block "0".

Then, a process where controller 1004 creates the escape-information-file out of the data-type-adaptive-coding-helper-file is demonstrated with reference to FIG. 27.

Step 701: Add "1" to a frame counter which shows "0" at starting so that a frame number agrees with the counter number.

Step 702: Add "1" to a macro-block-counter which counts a macro-block ID and shows "0" at starting. Then write the result into the escape information.

Step 703: From the helper-file, read frame-size-data of which frame number agrees with the counter number.

Step 704: Determine the coordinates of the respective macro-blocks responsive to each macro-block ID based on the frame-size data read in.

Step 705: From the helper-file, read a piece of region information within the frame of which frame number agrees with the counter number.

Step 706: Determine whether the macro-block is within the region or not by referring to the region information.

unnecessary processes by wasted estimation of motions can be thus eliminated.

Neither of orthogonal transformation, quantization, inverse orthogonal transformation, or inverse quantization is not practiced, thereby improving the process speed.

The data coded turn out smaller than the data by estimating motions, thereby improving the coding rate. Since this embodiment utilizes the information of a previous frame, a picture of better quality than a picture by estimating motions can be obtained.

In B frame, in case of coding macro-blocks of a region displaying the data free from time-varying such as a still picture or text data as escape-macro-blocks, when a forward frame needed for predicting has a totally different image, information is inserted into the macro-blocks so that a frame can be -predicted only in an backward direction, before the macro-blocks are coded.

In B frame, in case of coding macro-blocks of a region displaying the data free from time-varying such as a still picture or text data as escape-macro-blocks, when a backward frame needed for predicting has a totally different image, information is inserted into the macro-blocks so that a frame can be predicted only in an forward direction, before the macro-blocks are coded.

Exemplary Embodiment 5

An apparatus used in the fifth exemplary embodiment employs a method of changing quantization matrix instead of the method of changing the quantization characteristics, which has been used in the second exemplary embodiment. Materials other than those used in this method are the same as used in the second embodiment.

The fifth embodiment differs from the second one in the following

Step 707: When the macro-block is out of the region, determine whether another region information is in the frame of which frame number agrees with the counter number or not. If the region information exits, return to Step 705.

Step 708: When the macro-block is within the region, read data-type-information from the helper-file.

Step 709: Determine whether the macro-block is in a region where the source free from time-varying exists or not by referring to the data-type information.

Step 710: When the region has the source free from time-varying, reads the appearing-flag-information from the helper-file.

Step 711: By referring to the appearing-flag-information, determine whether the data of the region where the macro-block exists is the first appearance or not.

Step 712: In the case that the source firstly appears in this frame and also the case that the source of time-varying-video appears in a region of this frame, write a flag free from escaping into the escape-information-file.

Step 713: If the frame did not encounter the first appearance of the source, and the frame does not have another region information, write an escaping flag into the escape-information-file.

Step 714: Determine whether anther macro-block exists or not, if exists, return to Step 703, and if not, end the process.

This fourth embodiment as discussed above proves that the coding adaptive to the data-type can be practiced. When a region ▭ the sources such as a still picture or text data free from time-varying is displayed ☐ is processed, points. The content of the quantizer-controlling-file shown in FIG. 16 is changed into a content comprising a macro-block ID for numbering a macro-block with an ID No. and a quantization matrix ID responsive to the macro-block ID as shown in FIG. 30. The data-type-adaptive-quantization-characteristics shown in FIG. 17 is changed into data-type-adaptive-quantization-matrix-information shown in FIG. 31. This matrix information has a plurality of matrixes adaptive to a single data-type.

An operation of the apparatus having the construction discussed above is demonstrated hereinafter with reference to FIG. 32 and FIG. 33. The process flowchart by scenario analyzer 1001 is the same as described in FIG. 18 of the second embodiment.

Figure 32A:
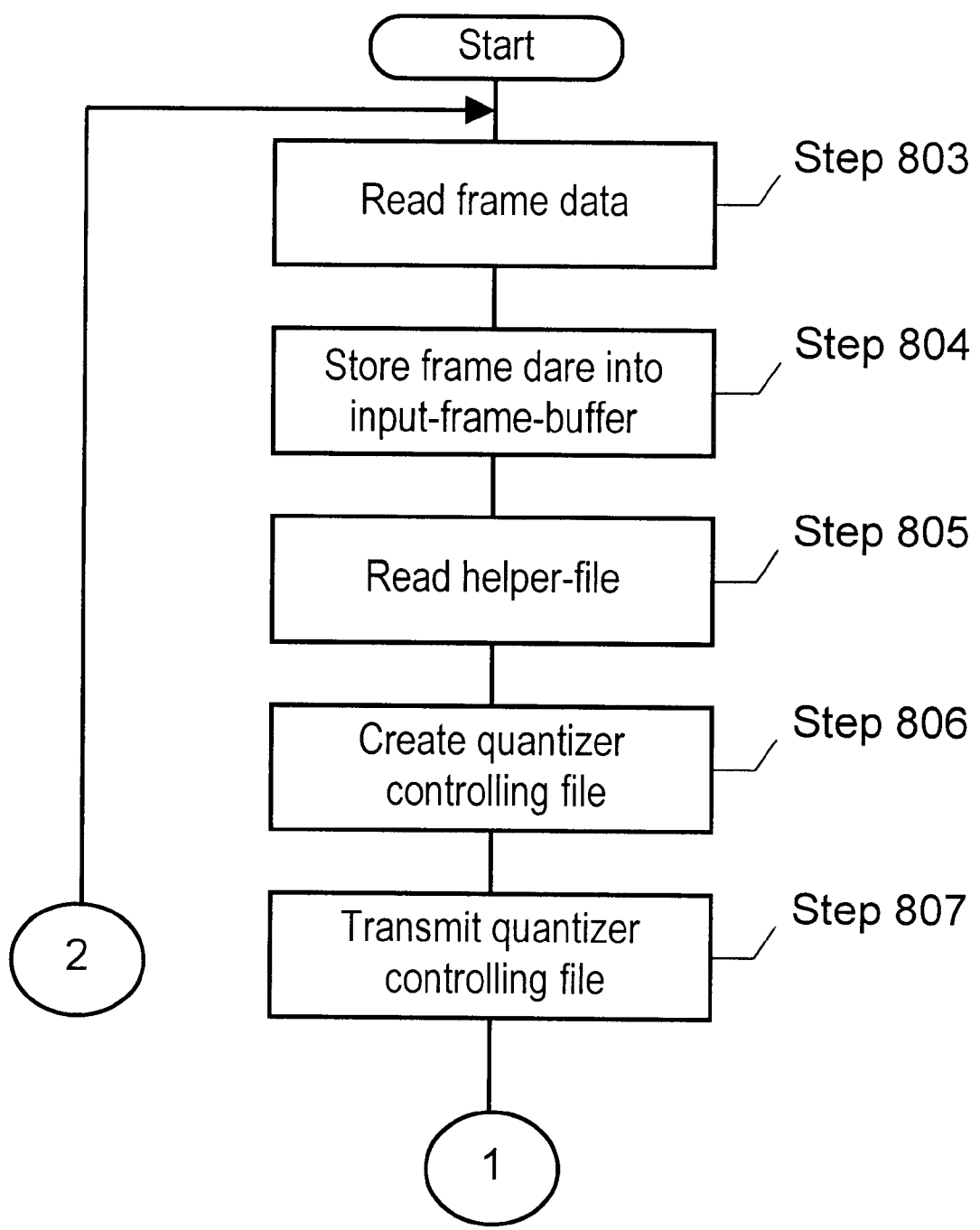
FIG. 32 is a flowchart illustrating a process of the encoder adaptive to a data type in accordance with the fifth exemplary embodiment.
Figure 32B:
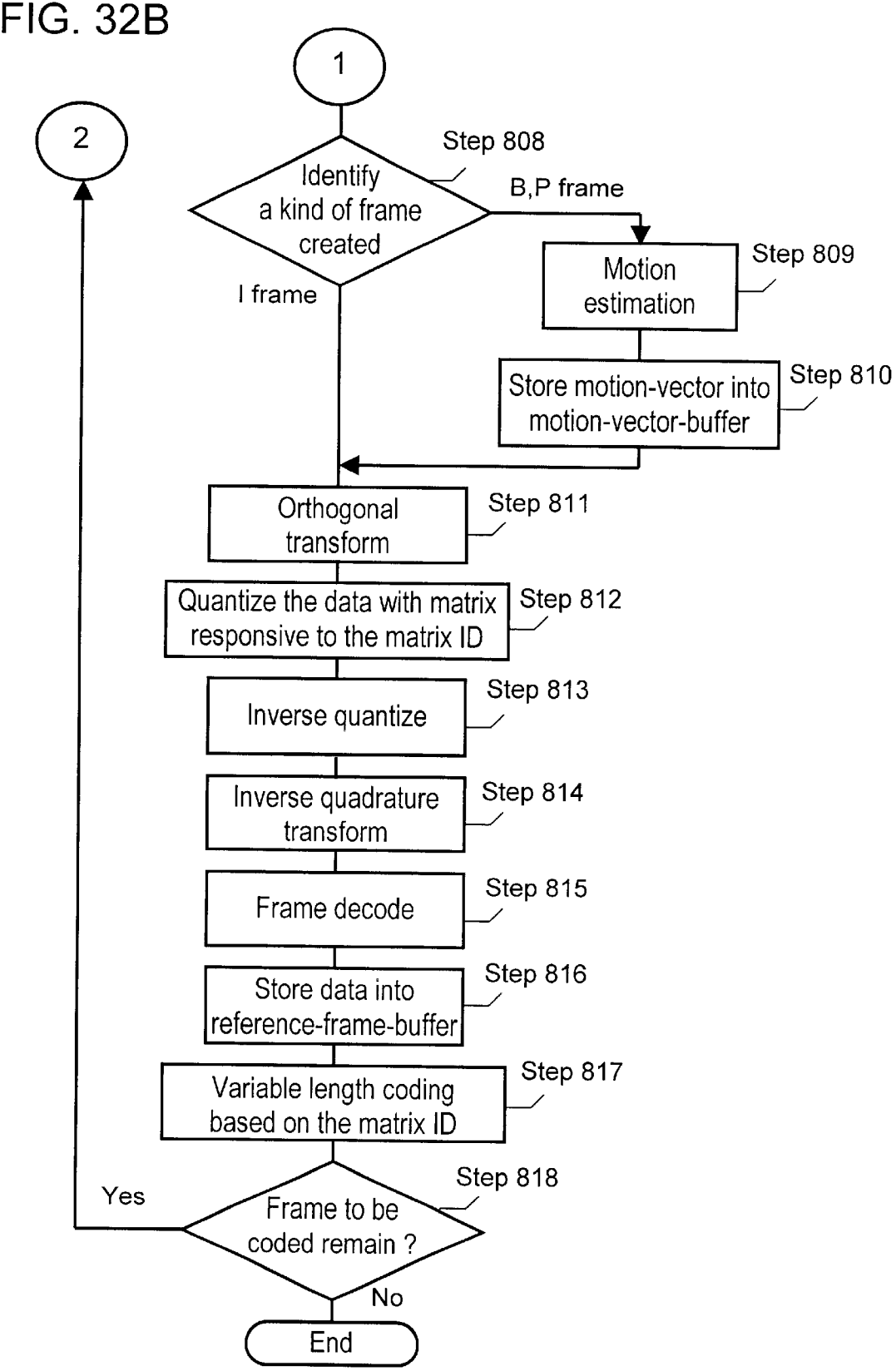

FIG. 32 is a process flowchart by data-type-adaptive-coding-section 1003. The different points between the flowcharts shown in FIG. 32 and FIG. 19 are described hereinafter.

Step 803 through Step 811 shown in FIG. 32 are the same as Step 103 through Step 111 shown in FIG. 19, thus the descriptions of these steps are omitted here.

Step 812: Quantizer 1009 has received the quantizer-controlling-file created by coding controller 1004 shown in FIG. 16. Quantizer 1009 determines a quantization-matrix-ID in a macro-block unit responsive to a macro-block ID detailed later, and then quantizes the data transmitted from orthogonal transformer 1008 ☐ by using a quantization matrix responsive to the quantization-matrix-ID which quantizer 1009 has already determined.

Step 813 through 816 shown in FIG. 32 are the same as Step 113 through Step 116 shown in FIG. 19. The descriptions of these steps are thus omitted here.

Step 817: Variable-length-encoder 1016 the data transmitted from quantizer 1009 with reference to the quantization-matrix-ID.

Step 818: Input identifier 1007 determines whether a frame to be coded still remains or not. If the frame remains, identifier 1007 reads the frame data created in frame editor 112 (repeat Step 803 and onward), if not, end the process.

As such, a frame data supplied is coded adaptively to its data type. When it is coded, the quantization-matrix is changed adaptively to the data type based on the information created by the scenario analyzer.

Coding controller 1004 creates a quantizer-controlling-file out of a data-type-adaptive-coding-helper-file. This process is described hereinafter with reference to FIG. 33 in the different points from that of the second embodiment shown in FIG. 21.

Steps 901 through 907 shown in FIG. 33 are the same as Steps 301 and 302 in FIG. 21. The descriptions of these steps are thus omitted here.

Step 908: Refer to the data-type-adaptive-quantization-matrix-information shown in FIG. 31.

Step 909: Based on the information of data-type-adaptive-quantization-matrix shown in FIG. 31, write the quantization matrix responsive to the data-type information read-in at Step 907 into the quantizer controlling file.

Step 910: When the macro block is outside the region, determine whether other region information is available in the frame of which frame No. agrees with the frame counter No or not. If available, return to Step 905.

Step 911: When the region information responsive to the macro block does not exist, determine the data-type to be background, and refer to the information of the quantization matrix.

Step 912: Based on the data-type-adaptive-quantization characteristics, write the quantization matrix in the case that the data-type is used as background into the quantizer controlling file.

Step 913: Determine whether other macro blocks are available in the region, and when available, return to Step 903. When not available, end the process.

As such, the fifth embodiment has proved the following advantage.

A quantizer receives a quantizer controlling file based on an analysis of a scenario, and refers to a quantizer controlling file as well as a macro block ID that has undergone an orthogonal transforming, and thereby quantizing data with an optimal quantization matrix. As a result, a source can be coded adaptively to its data type in an efficient manner.

Regarding a region where text data appears, a quantization matrix must be so prepared to value a high-frequency-component, i.e. coefficients of the region crowded with high-frequency-components must be lowered, and on the contrary, coefficients of the region crowded with low-frequency-components must be raised. Regarding a background, an artificial simple image, e.g. using only three colors such as graphics, is often used. Thus the quantization on the background employs a matrix where low-frequency-components are not valued.

As such, quantization matrixes adaptive to respective data types can be employed at quantization, so that text data is displayed with clear image of high-frequency-components.

A quantization matrix can be changed according to the ratio of region area of each source, i.e. a ratio among regions' areas where respective sources appear.

Exemplary Embodiment 6

An apparatus used in the sixth exemplary embodiment stores either one of the following two data into block-buffer 6017 shown in FIG. 34. (1) the first frame where the data of non-time-varying video such as a still picture or text data appears, or (2) the data obtained by quantizing the region in the first intra-frame, in the region the data of non-time-varying video appears. Among a sequence of frames where that data appears, the intra-frame does not undergo an orthogonal transform or quantization, but is coded by inserting the quantized data.

An entire construction of the apparatus in accordance with the sixth embodiment is the same as that used in the second embodiment and shown in FIG. 10. FIG. 34 is a block diagram of an inside structure of data-type-adaptive coding-section 1003 shown in FIG. 10.

Block buffer 6017 stores the following data: (1) a first frame where the data of non-time-varying-video such as a still picture or text data appears, or the data quantized of the region in an intra-frame, the region where the data of non-time-varying video appears, and (2) the data undergoes an inverse orthogonal transform and inverse quantization. Other elements are the same as shown in FIG. 13.

Input identifier 1007 used in this sixth embodiment utilizes block buffer 6017 based on the information supplied from coding-controller 1004, thereby distinguishing the data undergone quantization in the region where the data of non-time-varying-video such as a still picture or text data appears.

An operation of identifier 1007 is demonstrated. Identifier 1007 performs the following four items. (1) Quantizer 2009 quantizes the region where the data of non-time-varying-video such as a still picture or text data appears. Identifier 1007 receives the resultant (quantized) data from quantizer 2009, and stores it into block buffer 6017. (2) Identifier 1007 transmits the data stored in buffer 6017 to variable-length-encoder 1016 when intra-frames are displayed, i.e. during the period where the data of non-time-varying-video appears. (3) Identifier 1007 receives the data undergone an orthogonal transform and inverse quantization from frame-decoder 1012, and stores the same data into block buffer 6017. (4) Identifier 1007 transmits the same data stored in buffer 6017 to frame-decoder 1012 when intra-frames are decoded among the frames where the data of non-time-varying-video such as a still picture or text data appears.

As such the apparatus in accordance with the sixth embodiment proves the following advantage. In an intra-frame among the frames where the data of non-time-varying-video such as a still picture or text data appears, neither an orthogonal transform, quantization, inverse quantization nor inverse orthogonal transform is practiced, so that a process has been completed in a shorter time. No difference due to quantization methods occurs. As a result, picture quality is improved.

A combination of the function of encoder 1005 of this sixth embodiment with that of the third embodiment can be applied in the following case, i.e. in frames other than intra frames, the data of non-time-varying-video such as a still picture or text data appears.

If the function of encoder 1005 of this sixth embodiment is combined with the function of the encoder of the fourth embodiment, the data stored in the block-buffer can be displayed free from any changes in video from the first intra-frame where the data appears. This video can be kept free from any changes in video even when B or P frame is displayed. Thus the data is not subject to GOP units, and the picture quality is improved.

If the function of encoder 1005 of this sixth embodiment is combined with the function of the encoder of the fourth embodiment and that of the third embodiment, the data of non-time-varying-video is displayable without any changes in video during its display even when B or P frame is displayed. As a result, picture quality is improved.

Exemplary Embodiment 7

An apparatus in accordance with the seventh exemplary embodiment has the following features. Based on scenario information, when P or B frame is displayed, the apparatus inputs the information of "no change in the data" into P or B frame in every DCT block, except when the data of non-time-varying-video such as a still picture or text data appears.

The apparatus of producing coded video signals in accordance with the seventh embodiment has the same structure as used in the fourth embodiment. An operation of this apparatus has the following performance in addition to the operation described in the fourth embodiment. Among macro-blocks, if there are two or more than two regions having different data-types respectively, and also there is a region in a DCT block unit where the data of non-time-varying-video such as a still picture or text data appears, the information indicating a block-coding-pattern such as coded-block-pattern (CBP) in MPEG, whereby the information of "no change in the data" is supplied in every DCT block. This performance is added to the operation in the fourth embodiment.

Figure 35:
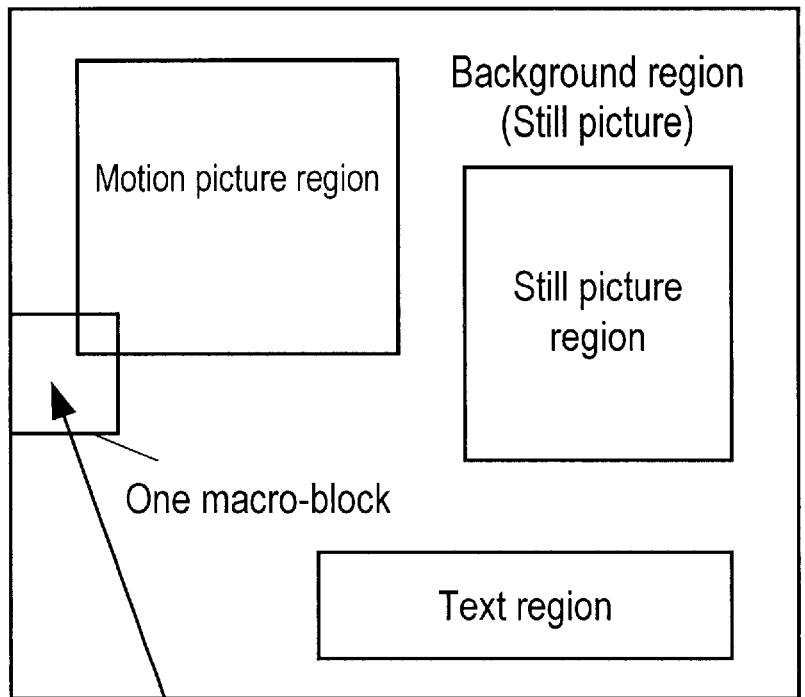
FIG. 35 is an image illustrating one macro block in one frame.
Figure 36:
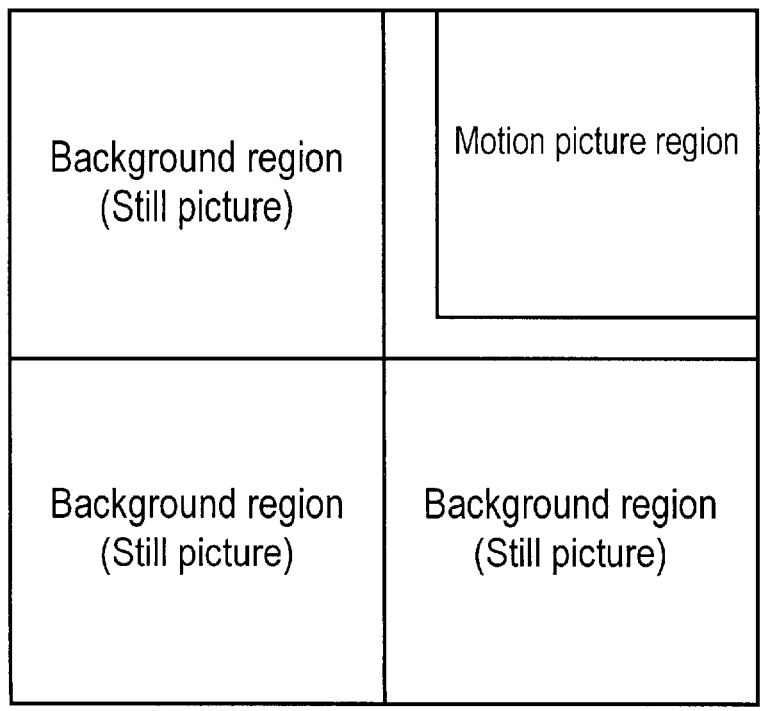
FIG. 36 is an image of an enlarged macro block shown in FIG. 35.

In the case of a macro-block shown in FIG. 35, for instance, regions shown in FIG. 36 exist in the macro-block. In this case, three blocks out of four DCT blocks are background regions which are still pictures forming a background. The information of "no change in every frame of these blocks" can be supplied to the macro block. For example, the information of coding patterns such as CBP is added to the macro-block. The coding pattern indicates "no change" in the three DCT blocks making up the background shown in FIG. 36.

As such, the seventh embodiment has demonstrated the advantages as follows: While the data of non-time-varying-video is displayed in every DCT block, the data can be free from changes in video. In the background of a motion picture as shown in FIG. 35, where a border between the data of non-time-varying and the data of time-varying is formed, the picture quality of non-time-varying-data is thus improved.

If the function of the data-type-adaptive-encoder in accordance with the seventh embodiment is combined with that of the fourth embodiment, the improved picture quality of non-time-varying-data as discussed above can be expected in addition to the advantage obtained by the fourth embodiment.

Exemplary Embodiment 8

Figure 37:
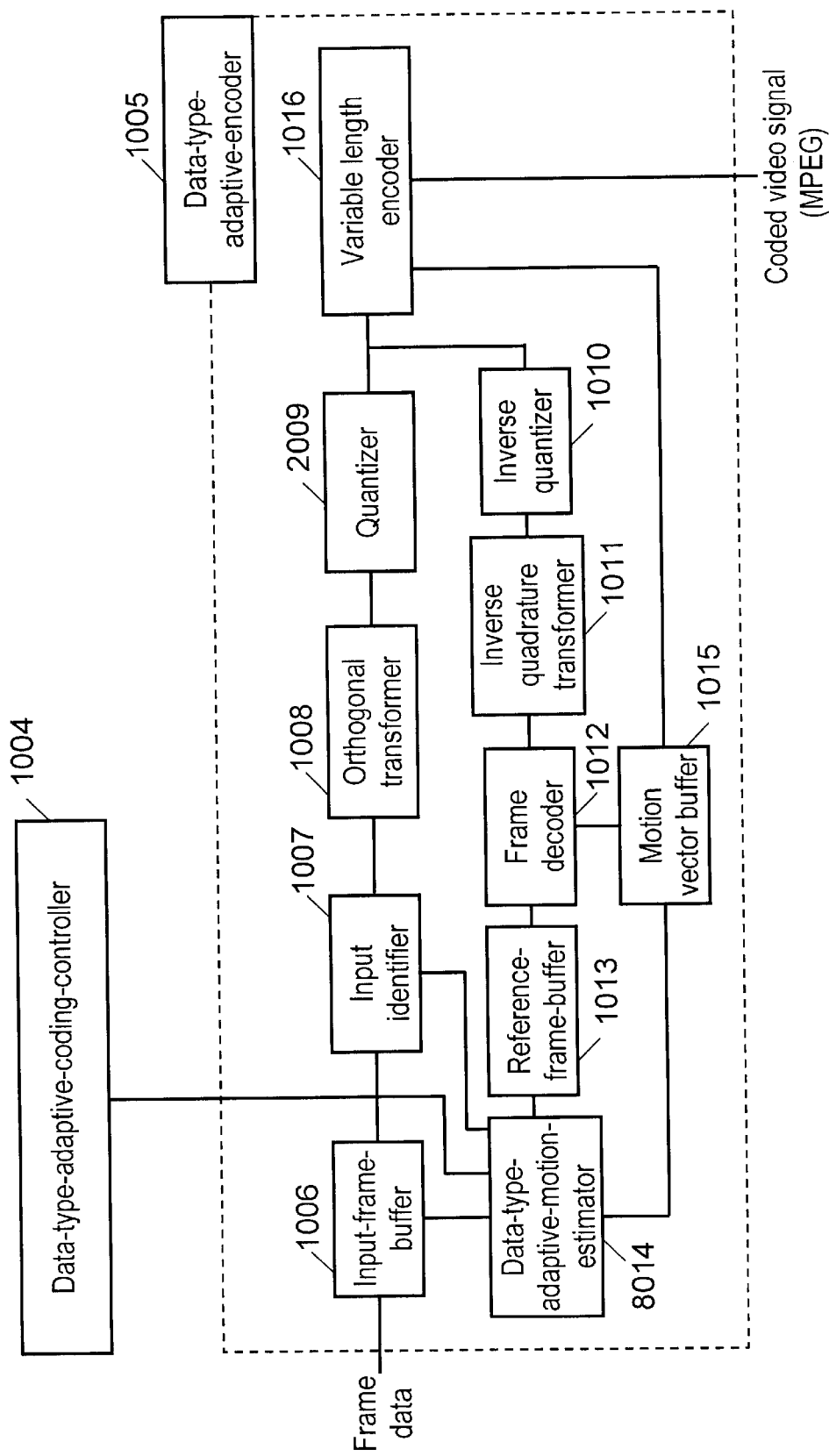
FIG. 37 is a block diagram of an encoder adaptive to a data type in accordance with the eighth exemplary embodiment.

An apparatus used in the eighth exemplary embodiment estimates a motion adaptive to its data-type in an efficient manner based on a scenario, where coding controller 1004 shown in FIG. 37 determines a search area of a motion estimator.

An entire construction of the apparatus in accordance with the eighth embodiment is the same as that used in the second embodiment and shown in FIG. 10. FIG. 37 is a block diagram of an inside structure of data-type-adaptive coding-section 1003 shown in FIG. 10.

Data-type-adaptive-motion-estimator 8014 is controlled by coding controller 1004 and estimates a motion adaptive to its data-type. Other elements are the same as shown in FIG. 13.

Figure 38:
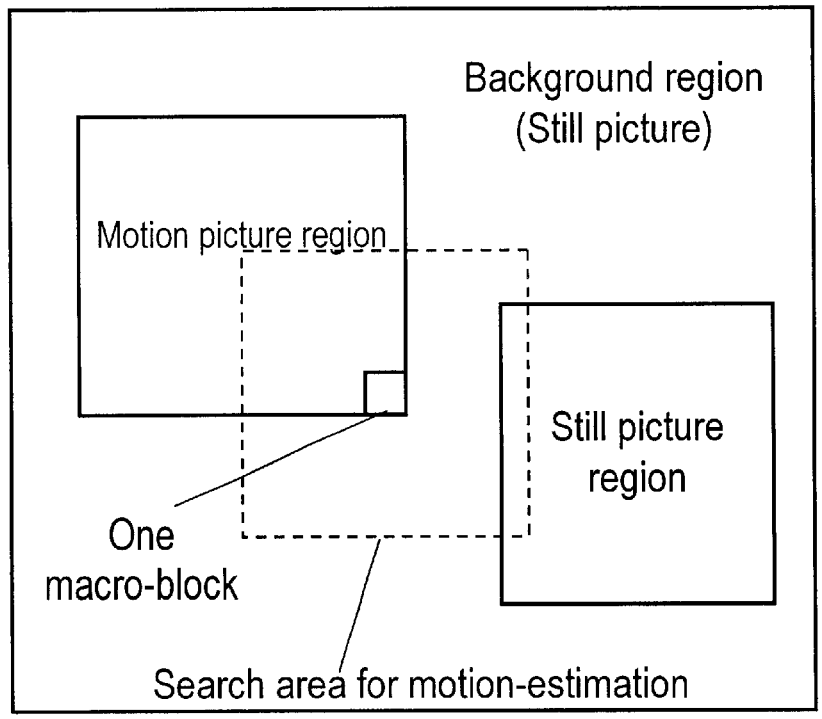
FIG. 38 is an image of a region where regular motion estimation can be searchable in one frame.

An operation of estimator 8014 is demonstrated hereinafter. If the search area for a macro-block is defined as shown in FIG. 38, coding controller 1004 utilizes the information narrowing down the search area shown in FIG. 39, whereby estimator 8014 estimates a motion within the narrowed search area.

Figure 39:
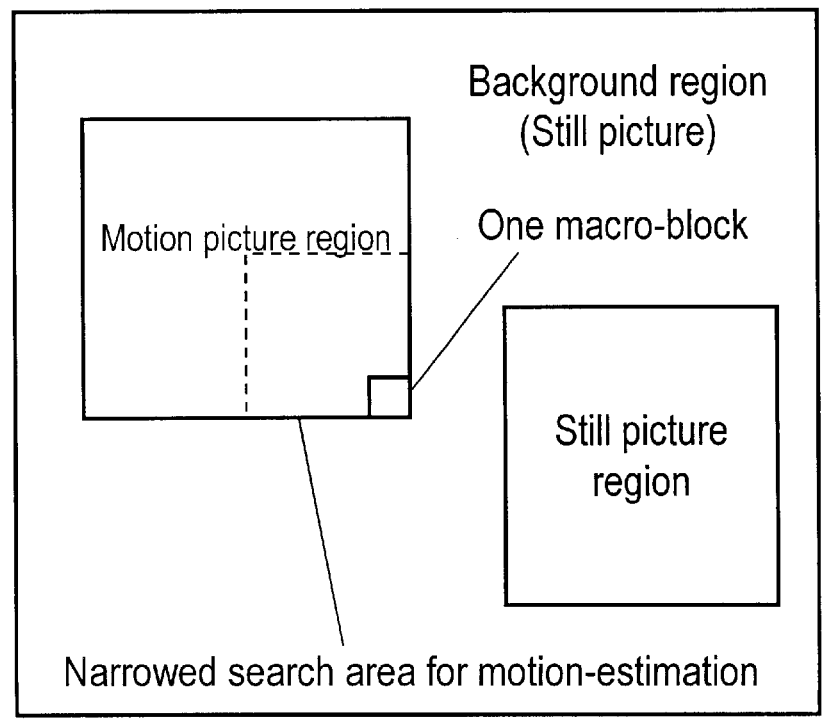
FIG. 39 is an image of a narrowed region where motion estimation can be searchable in one frame.

As such, the eighth embodiment has proved the advantage as follows: When a search area of motion estimation is defined as shown in FIG. 38, the search area is narrowed down as small as shown in FIG. 39. The process thus can be reduced and takes a shorter time. Estimation errors are also reduced, and as a result, picture quality is improved.

Figure 40:
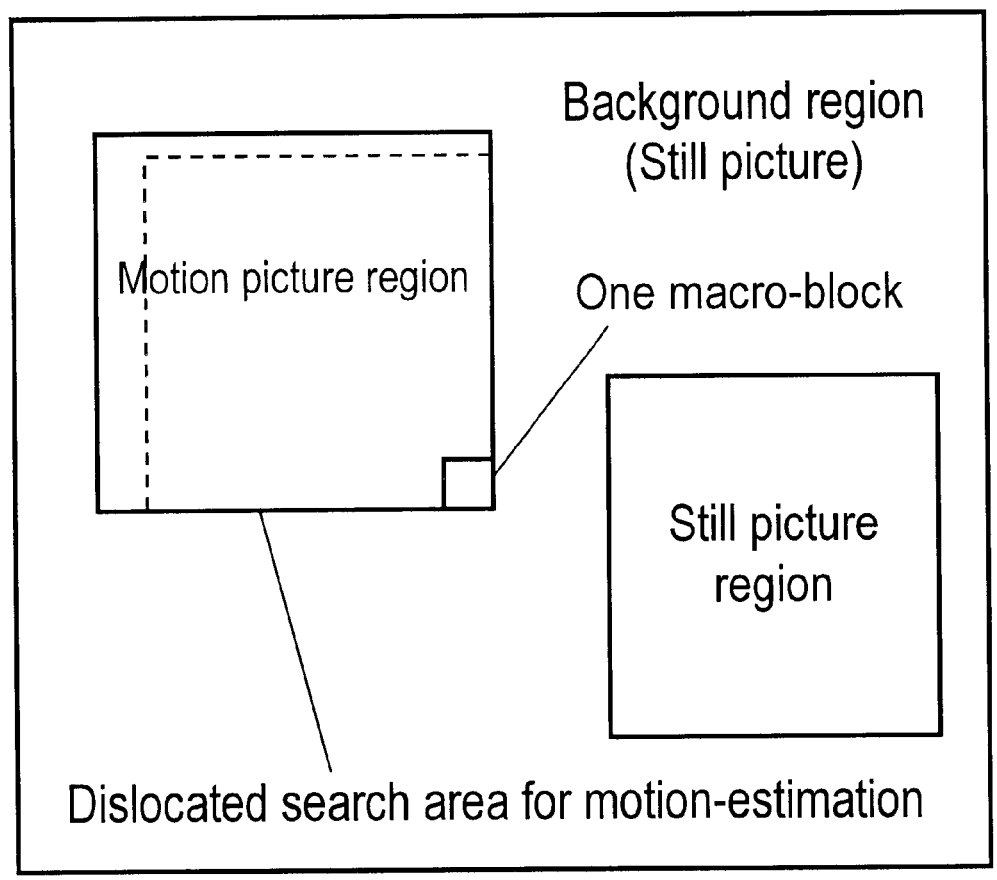
FIG. 40 is an image of a deviated region where motion estimation can be searchable in one frame.

The search area can be dislocated as shown in FIG. 40, so that more precise motion-estimation is practiced. Then picture quality is improved.

Exemplary embodiment 9

If MPEG 2 method is taken as an example, a quantization matrix is changeable only with a frame unit. However, an apparatus in accordance with this ninth exemplary embodiment utilizes quantization matrixes adaptive to respective data-types within the same frame, and thereby coding the data. For instance, for text data section, quantization matrixes adaptive to text data are used, and for a motion picture section, quantization matrixes optimum to motion picture are used.

A specific method is demonstrated hereinafter.

Figure 41:
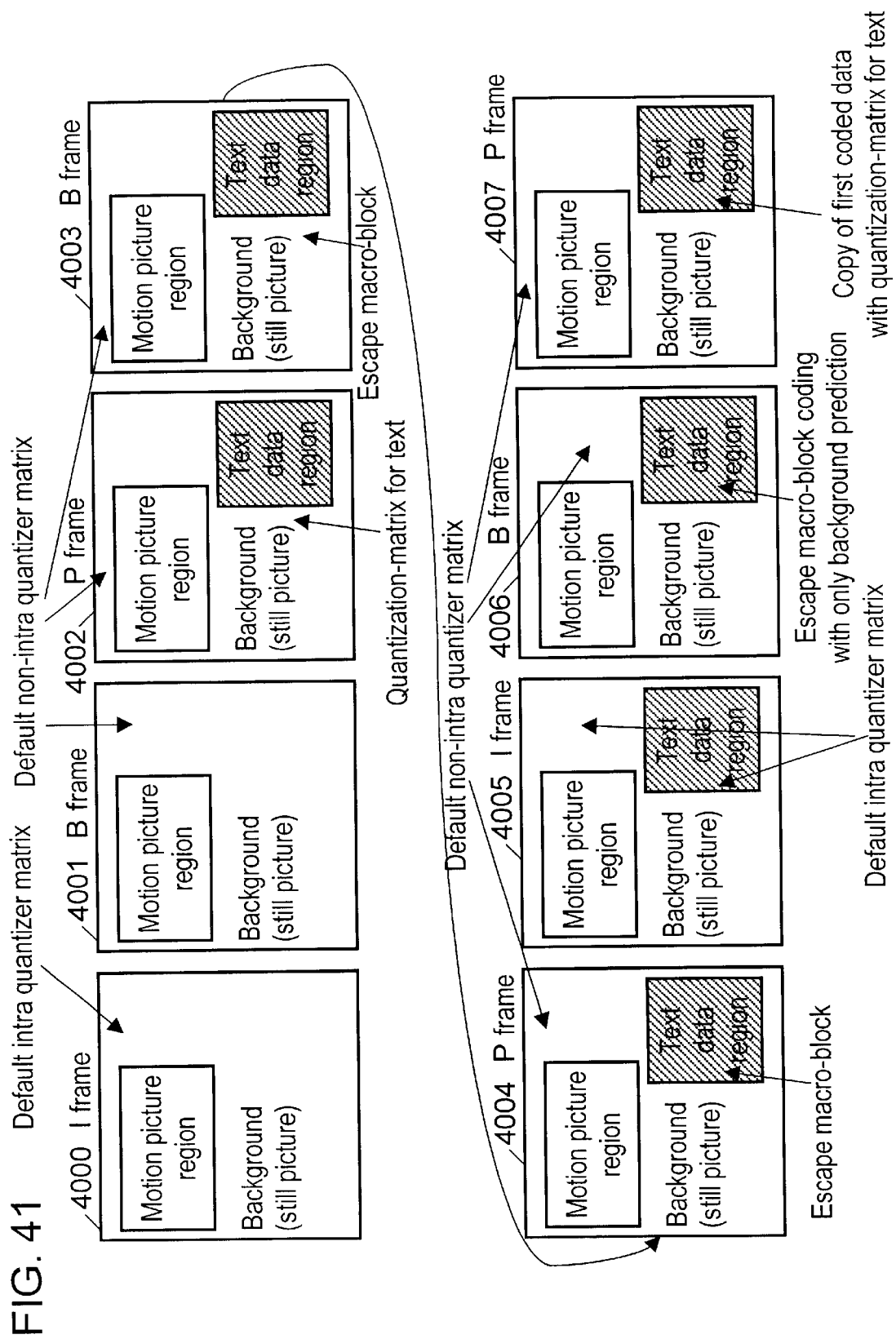
FIG. 41 is an image of encoding adaptive to a text data in a series of frames in accordance with a ninth exemplary embodiment.

(1) In the case that text data appears firstly on P or I frame:

(1-a) Code the macro-block as an intra-block, the macro-block includes a region where text-data appears, and the region is in the first P frame, e.g. 4007 frame, following the intra-frame as shown in FIG. 41. For this purpose, the data is quantized with a quantization matrix for intra-picture adaptive to text data. In regions other than the regions discussed above, the data are quantized by using quantization matrixes (non-intra-quantization-matrix) for differential motion vector found through the motion estimation.

(1-b) Between the P frame and the next intra-frame, escape information of "keeping as previous" is inserted in the region on P or B frames. On these frames, the same videos as shown in P frame discussed in (1-a) are displayed.

(1-c) In the intra-frame, the data inclusive text data are quantized with quantization matrix for a regular motion picture (default quantization matrix) adaptive to the entire frame.

(1-d) If B frame exists between the intra-frame and the P frame following the intra-frame, an estimation is arranged for B frame so that the coming P frame after the intra-frame only estimates a macro-block of the region where text data appears.

This series of performances are repeated during the display of text data, whereby the regions where text data appears except the intra-frames are displayed with the data undergone the quantization adaptive to text data.

When the first frame on which text data appears is an intra-frame, the same performance discussed in (1-c) is practiced.

(2)-1. In the case that text data appears firstly on B frame, and the next frame except B frame is P frame:

(2)-1-a. Code the macro-block as an intra-block, the macro-block includes a region where text-data appears, and the region is in P frame, e.g. 4007 frame, following the second intra-frame (4005) as shown in FIG. 41. For this purpose, the data is quantized with an intra-purpose quantization matrix adaptive to text data. In regions other than the above mentioned regions, the data are quantized by using quantization matrixes (non-intra-quantization-matrix) for differential motion vector found through the motion estimation.

(2)-i-b. Regarding B frames from the first B frame where text data appears firstly to the next P frame, an estimation is arranged for these B frames so that the coming P frame after the intra-frame only estimates a macro-block of the region where text data appears.

The regions where text data appear are thus displayed with the data undergone the quantization adaptive to text data.

(2)-2. In the case that text data appears firstly on B frame, and the next frame except B frame is I frame:

Regarding B frames from this first B frame to next I frame, code the macro-block as an intra-block, the macro-block includes a region where text-data appears. In this case, a quantization matrix for intra-picture adaptive to text data is used. Sources other than text data are quantized by using quantization matrixes (non-intra-quantization-matrix) for differential motion vector found through the motion estimation.

The data quantized as the intra-block where text data appears are stored in the block-buffer, and this data can be copied for the next intra-frame, thereby reducing a volume of calculation.

Figure 42:
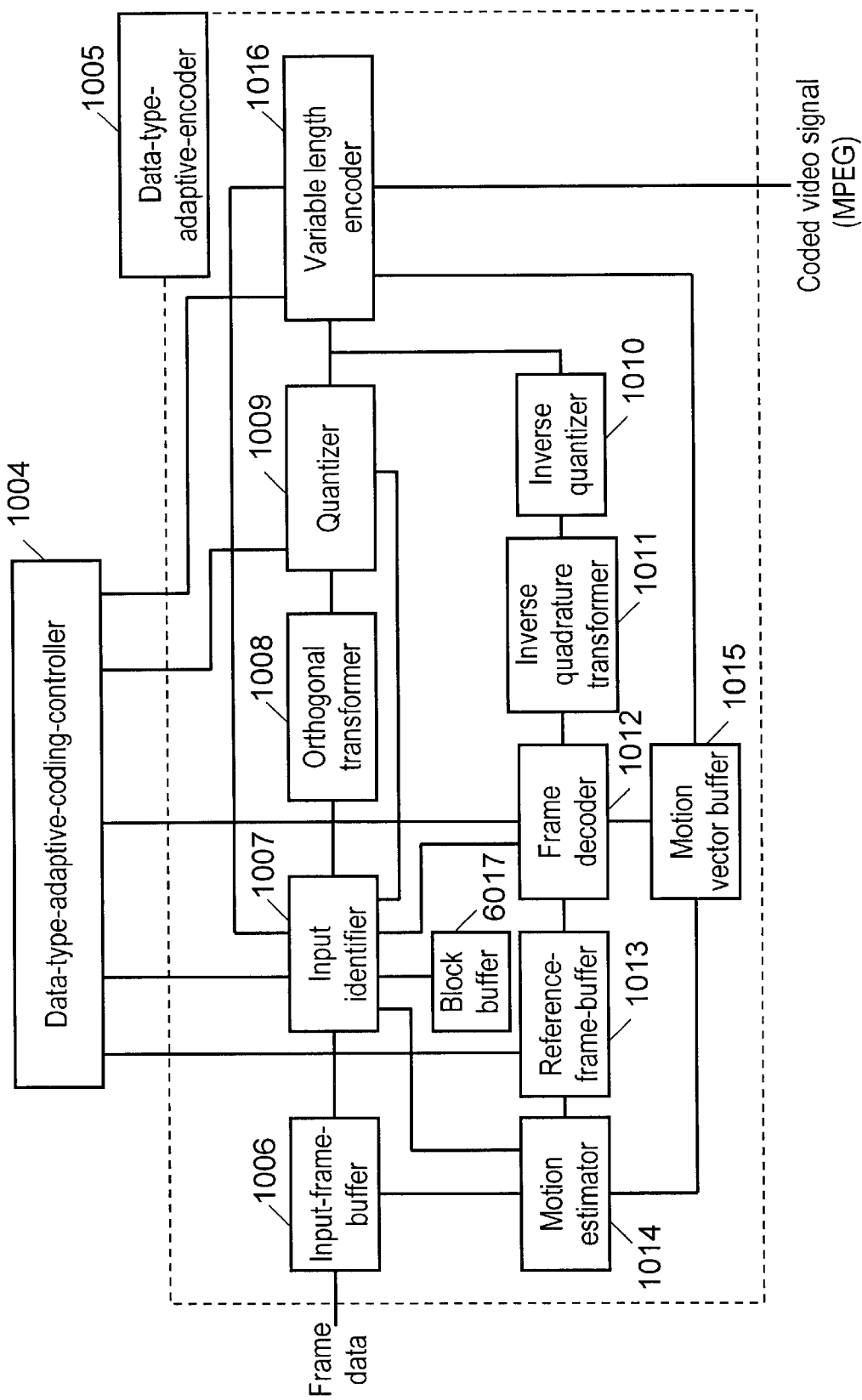
FIG. 42 is a block diagram of an encoder adaptive to a data type in accordance with the ninth exemplary embodiment.

An entire construction of the apparatus in accordance with the ninth embodiment is the same as that used in the second embodiment and shown in FIG. 10. FIG. 42 is a block diagram of an inside structure of data-type-adaptive coding-section 1003.

Block buffer 6017 stores the following data: (1) the data quantized as an intra-block in a first frame where text data appears, and (2) the data undergoes an inverse orthogonal transform and inverse quantization. Other elements are the same as shown in FIG. 13.

Input identifier 1007 used in this ninth embodiment utilizes block buffer 6017 based on the information supplied from coding-controller 1004, thereby utilizing efficiently the data quantized as the intra-block at appearing of text data.

In the region, macro-blocks where sources other than intra-frames and intra-blocks appear are specified as escape-macro-blocks where data are free from changes.

An operation of input identifier 1007 used in the ninth embodiment is demonstrated. Identifier 1007 practices the following jobs.

(1) Quantizer 2009 quantizes the region where text data appears. Identifier 1007 receives the resultant (quantized) data from quantizer 2009, and stores it into block buffer 6017. (2) Identifier 1007 transmits the data stored in buffer 6017 to variable-length-encoder 1016 when intra-frames are displayed, i.e. during the period where text data appears. (3) Identifier 1007 receives the data undergone an orthogonal transform and inverse quantization from frame-decoder 1012, and stores the same data into block buffer 6017. (4) Identifier 1007 transmits the same data stored in buffer 6017 to frame-decoder 1012 when P frame next to the intra-frames is decoded while text data appears. (5) While sources other than text data are displayed, the macro-blocks in the region other than the intra-frames and intra-blocks are coded as escape-macro-blocks.

As such the ninth embodiment has proved the following advantage:

If MPEG 2 method is taken as an example, a quantization matrix is changeable only with a frame unit. However, this ninth exemplary embodiment utilizes quantization matrixes adaptive to respective data-types within the same frame, and thereby coding the data. In actual, for text data section, quantization matrixes adaptive to text data are used. As a result, picture quality of the region where text data is displayed is improved.

This advantage is not limited to text data, but applicable to nontime-varying data, for which the quantization matrix adaptive to this data-type is utilized, and the data is thus efficiently coded.

To be more specific, regarding a region where text data appears, a quantization must be so prepared to value a high-frequency-component, i.e. coefficients of the region crowded with high-frequency-components must be lowered, and on the contrary, coefficients of the region crowded with low-frequency-components must be raised.

Regarding a background, an artificial simple image, e.g. using only three colors such as graphics, is often used. Thus the quantization on the background employs an unbalanced matrix where low-frequency-components are not valued. As such, quantization matrixes adaptive to respective data types can be employed at quantization, so that e.g. text data is displayed with clear image of high-frequency-components.

In the exemplary embodiments discussed previously, a process within a region of a single source has been discussed. However, the region of a single source can be divided into sections, and respective scenarios are equipped with relevant information. Each section can be coded based on respective information and adaptively to data-types of each section.

The data obtained by the apparatus and method is storable in a recording media.

What is claimed is:

1. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time-information describing when the source appears; and data-type-information describing the data-type of the source wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:

(a) an input identifier for identifying a frame data adaptive to a coding format of the frame data supplied;

(b) an orthogonal transformer for providing the supplied frame data with DCT process:

(c) a quantizer for quantizing the frame data undergone orthogonal transform;

(d) a motion estimation means for estimating a motion and outputting a motion vector data based on the frame data supplied and the quantized data quantized by said quantizer;

(e) a variable length encoder for coding both the frame data quantized and the motion-vector-data, wherein said motion estimating means refers to the coding format of the frame data identified by said input identifier;

wherein when data of non-time-varying-video appears in the supplied data, a macro-block within a display area of a frame other than a frame where the data has firstly appeared is coded as an escape-macro-block.

2. The multimedia information coding apparatus as defined in claim 1 wherein based on the helper-file, said data-type-adaptive-coding-controller creates quantization-controlling-information having quantization-matrix-information adaptive to a data-type and for each region, and wherein said quantizer is controlled based on the quantization-controlling-information.

3. The multimedia information coding apparatus as defined in claim 1 wherein said scenario analyzer allots each data-type to respective regions according to an area ratio of respective regions where each source appears, and wherein said quantizer quantizes data by changing a quantization matrix based on the allotment of the data-types.

4. The multimedia information coding apparatus as defined in claim 1 wherein for each frame and based on the helper-file, the coding controller allots each data-type to respective regions according to an area ratio of respective regions where each source appears, and the coding controller creates quantization-controlling-information having quantization-matrix-information of each frame, and wherein said quantizer quantizes data based on the quantization-controlling-information.

5. The multimedia information coding apparatus as defined in claim 1 further comprising a block buffer, and said motion estimating means further comprising (i) inverse quantizer for inversely quantizing the frame data undergone quantization; quantization with inverse DCT process, then creating a non-coded video signal; and (iii) frame decoder for decoding a frame from the frame data undergone inverse orthogonal transform, wherein said input identifier produces the following results:

(a) identifying a coding format of the supplied-frame-data to be an intra-frame, a bi-directional predictive frame and a predictive frame;

(b) receiving from said quantizer quantized data obtained by coding data in the supplied data as a first intra-block, and storing the received data into said block buffer;

(c) transmitting the data stored in the block buffer to a variable-length-encoder at an intra-frame while data of non-time-varying-video including a still picture and text data appears;

(d) receiving from a frame-decoder data undergone inverse orthogonal transform at said inverse orthogonal transformer and inverse quantization at said inverse quantizer, and stores the data into the block buffer; and (e) transmitting the data stored in the block buffer and received from the frame-decoder to the frame decoder when an intra-frame is decoded during data of non-time-varying-video being displayed.

6. The multimedia information coding apparatus as defined in claim 1 further comprising a block buffer, and said motion estimating means further comprising a motion estimating means further comprising (i) an inverse quantizer for inversely quantizing the frame data undergone quantization;

(ii) an inverse orthogonal transformer for providing the frame data undergone inverse quantization with inverse DCT process, then creating a non-coded video signal; and (iii) a frame decoder for decoding a frame from the frame data undergone inverse orthogonal transform, wherein said input identifier produces the following results:

(a) identifying a coding format of the supplied-frame-data to be an intra-frame, a bi-directional predictive frame and a predictive frame;

(b) reading th e supplied data and based on a process mode determined by the coding-controller, when a source has firstly appeared in a frame other than an intra-frame, identifying a block to be coded as the intra-block in a region the source appears in the frame;

(c) among the supplied-data, receiving from said quantizer quantized-data of a region where non-time-varying-data such as a still picture and text data appears, and storing the received data into the block buffer;

(d) transmitting the data stored in the block buffer to a variable-length-encoder at dan intra-frame while data of non-time-varying-video such as a still picture and text data appears;

(e) receiving from a frame-decoder data undergone inverse orthogonal-transform at said inverse orthogonal transformer and inverse quantization at said inverse quantizer, and stores the data into the block buffer; and (f) transmitting the data stored in the block buffer and received from the frame-decoder to the frame decoder when an intra-frame is decoded during data of non-time-varying-video being displayed.

7. The multimedia information coding apparatus as defined in claim 1 wherein when data of different data-types appear in the macro-block, and in a case of "no change from previous data" information can be inserted in a unit of DCT, quantization and DCT are eliminated by inserting information described with a coding pattern.

8. The multimedia information coding apparatus as defined in claim 1 wherein said motion estimation means is controlled by the coding-controller for estimating a motion adaptively to a data-type; and wherein a search area of motion estimation is defined based on information obtained by analyzing a scenario with said scenario analyzer.

9. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source;

wherein said data-type-adaptive-coding-section includes a data-type-adaptive-encoder and a data-type-adaptive-coding-controller which controls the data-type-adaptive-encoder, using the created helper-information;

further comprising a buffer for storing coded data of a region where a source appears, the region is in an intra-frame where a non-time-varying-source appears firstly, wherein when an intra-frame exists in a sequence of the frames where the source is kept displaying, the data stored in said buffer is copied on the intra-frame.

10. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source;

wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:

(a) an input identifier for identifying a frame data adaptive to a coding format of the frame data supplied;

(b) an orthogonal transformer for providing the supplied frame data with DCT process;

(c) a quantizer for quantizing the frame data undergone orthogonal transform;

(d) a motion estimation means for estimating a motion and outputting a motion vector data based on the frame data supplied and the quantized data quantized by said quantizer;

(e) a variable length encoder for coding both the frame data quantized and the motion-vector-data, wherein said motion estimating means refers to the coding format of the frame data identified by said input identifier;

wherein said input identifier identifies a coding format of the supplied-frame-data to be an intra-frame and a frame other than intra-frame;

wherein said data-type-adaptive-encoder produces results as follows:

(a) in a case that a frame data supplied is video data of one of text data and graphics:

(a-1) when a frame where the video data firstly appears is an intra-frame, a macro-block in a region where the frame data is displayed is coded as an intra-block;

(a-2) when the frame where the video data firstly appears is any frame other than an intra-frame, a macro-block in a region where the frame data is displayed is coded as an intra-block, and a quantization matrix adaptive to data-type of the video data is used, for the coding, (b) regions other than the region where the video data appears are quantized by using a quantization matrix for differential motion vector obtained through the motion estimation.

11. A multimedia information coding apparatus for codeine a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears time information describing when the source appears; and data-type-information describing the data type of the source;

wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:

(a) an input identifier for identifying a frame data adaptive to a coding format of the frame data supplied;

(b) an orthogonal transformer for providing the supplied frame data with DCT process;

(c) a quantizer for quantizing the frame data undergone orthogonal transform;

(d) a motion estimation means for estimating a motion and outputting a motion vector data based on the frame data supplied and the quantized data quantized by said quantizer;

(e) a variable length encoder for coding both the frame data quantized and the motion-vector-data, wherein said motion estimating means refers to the coding format of the frame data identified by said input identifier;

further comprising a block buffer, and said motion estimating means further comprising a motion estimating means further comprising:

(i) an inverse quantizer for inversely quantizing the frame data undergone quantization;

(ii) a n inverse orthogonal transformer for providing the frame data undergone inverse quantization with inverse DCT process, then creating a non-coded video signal; and (iii) a frame decoder for decoding a frame from the frame data undergone inverse orthogonal transform, wherein said input identifier produces results as follows:

(a) identifying a coding format of the supplied-frame-data to be an intra-frame and a frame other than intra-frame;

(b-1) when a frame where video data one of text data and graphics out of the supplied data appears firstly is an intra-frame, receiving from said quantizer quantized data of a region where a source of the next frame appears, and storing the quantized data into the block buffer;

(b-2) when a frame where video data one of text data and graphics out of the supplied data appears firstly is any frame other than an intra-frame, receiving from said quantizer quantized data of a region where a source of the frame appears, and storing the quantized data into the block buffer;

(c) transmitting the quantized data stored in the block buffer to said variable length encoder in coding a frame next to the intra-frame where the video data appears;

(d) receiving from a frame-decoder data undergone inverse orthogonal transform at said inverse orthogonal transformer and inverse quantization at said inverse quantizer, and stores the data into the block buffer;

(e) transmitting the data stored in the block buffer and received from the frame-decoder to the frame decoder when a frame next to the intra-frame is decoded during the video data being displayed; and (f) specifying a macro-block within a region where the video data appears as an escape-macro-block which displays a same video as a previous frame does, said macro-block is in a frame other than a frame where the video data firstly appears and any block other than intra-frame and intra-block, and wherein said quantizer quantizes data based on a process mode determined by the coding controller.

12. A method of coding multimedia information, the method coding each source adaptively to respective data-types based on scenario information, said method comprising the steps of:

(a) reading the scenario;

(b) obtaining, from the scenario, information including region and time a data-type of the source is displayed;

(c) based on the information obtained in step (b), creating information including the data-type of the source, region and time the data-type of the source is displayed for each frame;

(d) based on the information created in step (c), coding supplied data of a multimedia title for each frame by using at least one of following three steps:

(d-1) orthogonal transforming;

(d-2) quantizing data under gone the orthogonal transform; and (d-3) estimating a motion based on the supplied data and the Quantized data;

wherein in said step (d), (i) when a first frame where video data of a still graphics appear is an intra-frame, a macro-block included in a region where the video data is displayed in a coded frame is coded as an intra-block, where the coded frame follows the intra-frame and includes a predictive coded frame and a bidirectional predictive frame, and (ii) when a first frame where video data of still graphics appear is a frame other than an intra-frame, a macro-block included in a region where the video data is displayed in the frame and a following frame is coded as an intra-frame, wherein in a region where the video data coded as the intra-block appears, quantizing the data by using a quantization matrix for an intra adaptively to the video data, and wherein in the predictive frame and the bi-directional predictive frame, quantizing regions other than the region where the video data appears by using a quantization matrix for differential motion vector.

13. A method of coding multimedia information, the method coding each source adaptively to respective data-types based on scenario information, said method comprising the steps of:

(a) reading the scenario;

(b) obtaining, from the scenario, information including region and time a data/type of the source is displayed;

(c) based on the information obtained in step (b), creating information including the data-type of the source, region and time the data-type of the source is displayed for each frame;

(d) based on the information created in step (c), coding supplied data of a multimedia title for each frame by using at least one of following three steps:

(d-1) orthogonal transforming;

(d-2) quantizing data under gone the orthogonal transform; and (d-3) estimating a motion based on the supplied data and the quantized data;

wherein in said step (d), (i) when a first frame where video data of a still graphics appear is an intra-frame, in a frame other than a first intra-frame in due course of coding order following the intra-frame, a macro-block included in a frame where the video data is displayed is coded as an intra-block, and (ii) when a first frame where video data of still graphics appear is a frame other than the intra-frame, the macro-block in the region where the video data is displayed in the frame is coded as the intra-block, wherein in a region where the video data coded as the intra-block appears, quantizing the data by using a quantization matrix for an intra-picture adaptively to the video data, wherein inserting escape information which indicates displaying a same video as a previous frame into a block other than the block coded as the intra-block of the region where the video data appears, and wherein in the predictive frame and the bidirectional predictive frame, quantizing regions other than the region where the video data appears by using a quantization matrix for differential motion vector.

14. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source wherein said data-type-adaptive-coding-section includes a data-type-adaptive-encoder and a data-type-adaptive-coding-controller which controls the data-type-adaptive-encoder, using the created helper-information; and wherein the data-type-adaptive-coding-controller creates quantization controlling information having region-oriented quantization-characteristic-information adaptive to the data-type based on the helper-information.

15. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:

(a) an input identifier for identifying a frame data adaptive to a coding format of the frame data supplied;

(b) an orthogonal transformer for providing the supplied frame data with DCT process;

(c) a quantizer for quantizing the frame data undergone orthogonal transform;

(d) a motion estimation means for estimating a motion and outputting a motion vector data based on the frame data supplied and the quantized data quantized by said quantizer;

(e) a variable length encoder for coding both the frame data quantized and the motion-vector-data, wherein said motion estimating means refers to the coding format of the frame data identified by said input identifier; and wherein when data of non-time-varying-video appears in the supplied data, a macro-block within a display area of a frame other than a frame where the data has firstly appeared is coded as an escape-macro-block.

16. The multimedia information coding apparatus as defined in claim 15 wherein when data of different data-types appear in the macro-block, and in a case of "no change from previous data" information can be inserted in a unit of DCT, quantization and DCT are eliminated by inserting information described with a coding pattern.

17. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source wherein said data-type-adaptive-coding-section includes a data-type-adaptive-encoder and a data-type-adaptive-coding-controller which controls the data-type-adaptive-encoder, using the created helper-information; and wherein said multimedia information coding apparatus further comprising a buffer for storing coded data of a region where a source appears, the region is in an intra-frame where a non-time-varying-source appears firstly; wherein when an intra-frame exists in a sequence of the frames where the source is kept displaying, the data stored in said buffer is copied on the intra-frame.

18. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:

(a) an input identifier for identifying a frame data adaptive to a coding format of the frame data supplied;

(b) an orthogonal transformer for providing the supplied frame data with DCT process;

(c) a quantizer for quantizing the frame data undergone orthogonal transform;

(d) a motion estimation means for estimating a motion and outputting a motion vector data based on the frame data supplied and the quantized data quantized by said quantizer;

(e) a variable length encoder for coding both the frame data quantized and the motion-vector-data, wherein said motion estimating means refers to the coding format of the frame data identified by said input identifier;

wherein said multimedia information coding apparatus further comprising a block buffer; and said motion estimating means further comprising:
  (i) inverse quantizer for inversely quantizing the frame data undergone quantization;
  (ii) inverse orthogonal transformer for providing the frame data undergone inverse quantization with inverse DCT process, then creating a non-coded video signal; and
  (iii) frame decoder for decoding a frame from the frame data undergone inverse orthogonal transform, wherein said input identifier produces the following results:
  (a) identifying a coding format of the supplied-frame-data to be an intra-frame, a bidirectional predictive frame and a predictive frame;
  (b) receiving from said quantizer quantized data obtained by coding data in the supplied data as a first intra-block, and storing the received data into said block buffer;
  (c) transmitting the data stored in the block buffer to a variable-length-encoder at an intra-frame while data of non-time-varying-video including a still picture and text data appears;
  (d) receiving from a frame-decoder data undergone inverse orthogonal transform at said inverse orthogonal transformer and inverse quantization at said inverse quantizer, and stores the data into the block buffer; and
  (e) transmitting the data stored in the block buffer and received from the frame-decoder to the frame decoder when an intra-frame is decoded during data of non-time-varying-video being displayed.

19. A multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and data-type-information describing the data-type of the source wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:
  (a) an input identifier for identifying a frame data adaptive to a coding format of the frame data supplied;
  (b) an orthogonal transformer for providing the supplied frame data with DCT process;
  (c) a quantizer for quantizing the frame data undergone orthogonal transform;
  (d) a motion estimation means for estimating a motion and outputting a motion vector data based on the frame data supplied and the quantized data quantized by said quantizer;
  (e) a variable length encoder for coding both the frame data quantized and the motion-vector-data, wherein said motion estimating means refers to the coding format of the frame data identified by said input identifier;

wherein said multimedia information coding apparatus further comprising a block buffer; and said motion estimating means further comprising a motion estimating means further comprising:
  (i) an inverse quantizer for inversely quantizing the frame data undergone quantization;
  (ii) an inverse orthogonal transformer for providing the frame data undergone inverse quantization with inverse DCT process, then creating a non-coded video signal; and
  (iii) frame decoder for decoding a frame from the frame data undergone inverse orthogonal transform, wherein said input identifier produces the following results:
  (a) identifying a coding format of the supplied-frame-data to be an intra-frame, a bidirectional predictive frame and a predictive frame;
  (b) reading the supplied data and based on a process mode determined by the coding-controller, when a source has firstly appeared in a frame other than an intra-frame, identifying a block to be coded as the intra-block in a region the source appears in the frame;
  (c) among the supplied-data, receiving from said quantizer quantized-data of a region where non-time-varying-data such as a still picture and text data appears, and storing the received data into the block buffer;
  (d) transmitting the data stored in the block buffer to a variable-length-encoder at an intra-frame while data of non-time-varying-video including a still picture and text data appears;
  (e) r receiving from a frame-decoder data undergone inverse orthogonal transform at said inverse orthogonal transformer and inverse quantization at said inverse quantizer, and stores the data into th e block buffer; and
  (f) transmitting the data stored in the block buffer and received from the frame-decoder to the frame decoder when an intra-frame is decoded during data of non-time-varying-video being displayed.

20. The multimedia information coding apparatus for coding a multimedia title adaptively to respective data-type of each source based on scenario information, said apparatus comprising:

a scenario analyzer for analyzing a scenario; and a data-type-adaptive-coding section for coding data adaptively to own data type based on the scenario information analyzed;

wherein said scenario analyzer creates data-type-adaptive-coding-helper-information including for each frame:

region information describing which region the source appears;

time information describing when the source appears; and
data-type-information describing the data-type of the source
wherein said data-type-adaptive-coding-section includes a data-type-adaptive-encoder and a data-type-adaptive-coding-controller which controls the data-type-adaptive-encoder, using the created helper-information; and
wherein the data-type-adaptive-encoder comprising:
(a) an input identifier for identifying a frame data adaptive to a coding format of the frame data supplied;
(b) an orthogonal transformer for providing the supplied frame data with DCT process;
(c) a quantizer for quantizing the frame data undergone orthogonal transform;
(d) a motion estimation means for estimating a motion and outputting a motion vector data based on the frame data supplied and the quantized data quantized by said quantizer;
(e) a variable length encoder for coding both the frame data quantized and the motion-vector-data,
wherein said motion estimating means refers to the coding format of the frame data identified by said input identifier; and
wherein said input identifier identifies a coding format of the supplied-frame-data to be an intra-frame and a frame other than intra-frame;
wherein said data-type-adaptive-encoder produces results as follows:
(a) in a case that a frame data supplied is video data of one of text data and graphics:
(a-1) when a frame where the video data firstly appears is an intra-frame, a macro-block in a region where the frame data is displayed is coded as an intra-block;
(a-2) when the frame where the video data firstly appears is any frame other than an intra-frame, a macro-block in a region where the frame data is displayed is coded as an intra-block, and a quantization matrix adaptive to data-type of the video data is used for the coding,
(b) regions other than the region where the video data appears are quantized by using a quantization matrix for differential motion vector obtained through the motion estimation.

21. A multimedia information coding apparatus for coding a multimedia title adaptively to respective data-type of each source based on scenario information, said apparatus comprising:
a scenario analyzer for analyzing a scenario; and
a data-type-adaptive-coding section for coding data adaptively to own data type based on the scenario information analyzed;
wherein said scenario analyzer creates data-type-adaptive-coding-helper-information including for each frame:
region information describing which region the source appears;
time information describing when the source appears; and
data-type-information describing the data-type of the source
wherein said data-type-adaptive-coding-section includes a data-type-adaptive-encoder and a data-type-adaptive-coding-controller which controls the data-type-adaptive-encoder, using the created helper-information;

wherein said data-type-adaptive-encoder comprising:
(a) an input identifier for identifying a frame data adaptive to a coding format of the frame data supplied;
(b) an orthogonal transformer for providing the supplied frame data with DCT process;
(c) a quantizer for quantizing the frame data undergone orthogonal transform;
(d) a motion estimation means for estimating a motion and outputting a motion vector data based on the frame data supplied and the quantized data quantized by said quantizer;
(e) a variable length encoder for coding both the frame data quantized and the motion-vector-data,
wherein said motion estimating means refers to the coding format of the frame data identified by said input identifier; and
wherein said multimedia information coding apparatus further comprising a block buffer, and said motion estimating means further comprising a motion estimating means further comprising:
(i) an inverse quantizer for inversely quantizing the frame data undergone quantization;
(ii) an inverse orthogonal transformer for providing the frame data undergone inverse quantization with inverse DCT process, then creating a non-coded video signal; and
(iii) a frame decoder for decoding a frame from the frame data undergone inverse orthogonal transform,
wherein said input identifier produces results as follows:
(a) identifying a coding format of the supplied-frame-data to be an intra-frame and a frame other than intra-frame;
(b-1) when a frame where video data one of text data and graphics out of the supplied data appears firstly is an intra-frame, receiving from said quantizer quantized data of a region where a source of the next frame appears, and storing the quantized data into the block buffer;
(b-2) when a frame where video data one of text data and graphics out of the supplied data appears firstly is any frame other than an intra-frame, receiving from said quantizer quantized data of a region where a source of the frame appears, and storing the quantized data into the block buffer;
(c) transmitting the quantized data stored in the block buffer to said variable length encoder in coding a frame next to the intra-frame where the video data appears;
(d) receiving from a frame-decoder data undergone inverse orthogonal transform at said inverse orthogonal transformer and inverse quantization at said inverse quantizer, and stores the data into the block buffer;
(e) transmitting the data stored in the block buffer and received from the frame-decoder to the frame decoder when a frame next to the intra-frame is decoded during the video data being displayed; and
(f) specifying a macro-block within a region where the video data appears as an escape-macro-block which displays a same video as a previous frame does, said macro-block is in a frame other than a frame where the video data firstly appears and any block other than intra-frame and intra-block, and
wherein said quantizer quantizes data based on a process mode determined by the coding controller.

22. A method of coding multimedia information, the method of coding each source adoptively to respective data-types based on scenario information, said method comprising the steps of:

(a) reading the scenario;

(b) obtaining, from the scenario, information including region and time a data-type of th e source is displayed;

(c) based on the information obtained in step (b), creating information including the data-type of the source, region and time the data-type of the source is displayed for each frame;

(d) based on the information created in step (c), coding supplied data of a multimedia title for each frame by using at least one of following three steps:
(d-1) orthogonal transforming;
(d-2) quantizing data under gone the orthogonal transform; and
(d-3) estimating a motion based on the supplied data and the quantized data, wherein in said step (d), (i) when a first frame where video data of a still graphics appear is an intra-frame, a macro-block included in a region where the video data is displayed in a coded frame is coded as an intra-block, where the coded frame follows the intra-frame and includes a predictive coded frame and a bi-directional predictive frame, and (ii) when a first frame where video data of still graphics appear is a frame other than an intra-frame, a macro-block included in a region where the video data is displayed in the frame and a following frame is coded as an intra-frame, wherein in a region where the video data coded as the intra-block appears, quantizing the data by using a quantization matrix for an intra-picture adaptively to the video data, and wherein in the predictive frame and the bi-directional predictive frame, quantizing regions other than the region where the video data appears by using a quantization matrix for differential motion vector.

23. A method of coding multimedia information, the method of coding each source adaptively to respective data-types based on scenario information, said method comprising the steps of:

(a) reading the scenario;

(b) obtaining, from the scenario, information including region and time a data-type of the source is displayed;

(c) based on the information obtained in step (b), creating information including the data-type of the source, region and time the data-type of the source is displayed for each frame;

(d) based on the information created in step (c), coding supplied data of a multimedia title for each frame by using at least one of following three steps:
(d-1) orthogonal transforming;
(d-2) quantizing data under gone the orthogonal transform; and
(d-3) estimating a motion based on the supplied data and the quantized data, wherein in said step (d), (i) when a first frame where video data of a still graphics appear is an intra-frame, in a frame other than a first intra-frame in due course of coding order following the intra-frame, a macro-block included in a frame where the video data is displayed is coded as an intra-block, and (ii) when a first frame where video data of still graphics appear is a frame other than the intra-frame, the macro-block in the region where the video data is displayed in the frame is coded as the intra-block, wherein in a region where the video data coded as the intra-block appears, quantizing the data by using a quantization matrix for an intra-picture adaptively to the video data, wherein inserting escape information which indicates displaying a same video as a previous frame in to a block other than the block coded as the intra-block of the region where the video data appears, and wherein in the predictive frame and the bi-directional predictive frame, quantizing regions other than the region where the video data appears by using a quantization matrix for differential motion vector.

* * * * *

UNITED STATES PATENT AND TRADEMARK OFFICE
CERTIFICATE OF CORRECTION

PATENT NO. : 6,804,302 B1
DATED : October 12, 2004
INVENTOR(S) : Kazunori Yamada et al.

It is certified that error appears in the above-identified patent and that said Letters Patent is hereby corrected as shown below:

Column 24,
Line 7, between "quantization;" and "quantization", insert -- (ii) inverse orthogonal transformer for providing the frame data undergone inverse --.
Line 49, "th e" should read -- the --.
Line 60, "dan" should read -- an --.

Column 26,
Line 31, between "used" and "for", delete ",".
Line 37, "codeine" should read -- coding --.
Line 48, between "appears" and "time", insert -- ; --.

Column 27,
Line 11, "a n" should read -- an --.

Column 28,
Line 5, "Quantized" should read -- quantized --.
Line 11, "bidirectional" should read -- bi-directional --.
Line 31, "data/type" should read -- data-type --.

Column 31,
Line 24, "bidirectional" should read -- bi-directional --.

Column 32,
Line 29, "bidirectional" should read -- bi-directional --.
Line 46, before "receiving" delete "r".
Line 49, "th e" soudl read -- the --.

UNITED STATES PATENT AND TRADEMARK OFFICE
CERTIFICATE OF CORRECTION

PATENT NO. : 6,804,302 B1
DATED : October 12, 2004
INVENTOR(S) : Kazunori Yamada et al.

It is certified that error appears in the above-identified patent and that said Letters Patent is hereby corrected as shown below:

Column 35,
Line 2, "adoptively" should read -- adaptively --.
Line 7, "th e" should read -- the --.

Signed and Sealed this

Third Day of May, 2005

JON W. DUDAS
*Director of the United States Patent and Trademark Office*